(12) United States Patent
King

(10) Patent No.: US 12,202,512 B1
(45) Date of Patent: Jan. 21, 2025

(54) PERCEPTION VALIDATION FOR AUTONOMOUS VEHICLES

(71) Applicant: Aurora Operations, Inc., Pittsburgh, PA (US)

(72) Inventor: Davis Edward King, Billerica, MA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

(21) Appl. No.: 18/628,336

(22) Filed: Apr. 5, 2024

(51) Int. Cl.
*B60W 60/00* (2020.01)
*B60W 50/06* (2006.01)

(52) U.S. Cl.
CPC .......... *B60W 60/001* (2020.02); *B60W 50/06* (2013.01); *B60W 2420/00* (2013.01); *B60W 2554/404* (2020.02)

(58) Field of Classification Search
CPC ............. B60W 50/0097; B60W 50/06; B60W 60/001; B60W 60/0027; B60W 2420/00; B60W 2554/20; B60W 2554/40; B60W 2554/404; B60W 2554/4041; B60W 2554/4044; B60W 2554/80; G06V 10/70; G06V 10/72; G06V 10/75; G06V 10/757; G06V 10/759; G06V 10/761; G06V 10/82; G06V 10/98; G06V 2201/08; G08G 1/017; G08G 1/052; G08G 1/056
See application file for complete search history.

(56) References Cited

U.S. PATENT DOCUMENTS 11,209,824 B1 12/2021 Kingman
2019/0310654 A1* 10/2019 Halder .................. B60W 60/00
(Continued)

FOREIGN PATENT DOCUMENTS

WO WO 2017/195510 A1 11/2017
WO WO 2020/044904 A1 3/2020

OTHER PUBLICATIONS

Bani-Hani, et al., "Autonomous vehicles trajectory prediction approach using machine learning test", In 2023 14th International Conference on Information and Communication Systems (ICICS), IEEE, 2023, 6 pages.
U.S. Notice of Allowance for U.S. Appl. No. 18/633,191, mailed Jul. 17, 2024, 12 pages.

*Primary Examiner* — Russell Frejd
*Assistant Examiner* — Brandon Z Willis
(74) *Attorney, Agent, or Firm* — Dority & Manning, P.A.

(57) ABSTRACT

An example method includes (a) obtaining an object detection from a perception system that describes an object in an environment of the autonomous vehicle; (b) obtaining, from a reference dataset, a label that describes a reference position of the object in the environment; (c) determining a plurality of component divergence values respectively for a plurality of divergence metrics, wherein a respective divergence value characterizes a respective difference between the object detection and the label; (d) providing the plurality of component divergence values to a machine-learned model to generate a score that indicates an aggregate divergence between the object detection and the label, wherein the machine-learned model includes a plurality of learned parameters defining an influence of the plurality of component divergence values on the score; (e) evaluating a quality of a match between the object detection and the label based on the score.

20 Claims, 16 Drawing Sheets

(56) References Cited

U.S. PATENT DOCUMENTS

| | | |
|---|---|---|
| 2020/0050536 A1 | 2/2020 | Nygaard et al. |
| 2021/0133474 A1* | 5/2021 | Sawada .................. G06N 3/045 |
| 2021/0279640 A1* | 9/2021 | Tu .......................... G06V 10/82 |
| 2023/0067822 A1 | 3/2023 | Jiang et al. |
| 2023/0290132 A1* | 9/2023 | Mahendran ............ G06V 20/20 |
| 2023/0373498 A1* | 11/2023 | Schroder ........... B60W 50/0097 |
| 2024/0017741 A1 | 1/2024 | Sandberg et al. |

* cited by examiner

PERCEPTION VALIDATION FOR AUTONOMOUS VEHICLES

BACKGROUND

An autonomous platform can process data to perceive an environment through which the autonomous platform travels. For example, an autonomous vehicle can perceive its environment using a variety of sensors and identify objects around the autonomous vehicle. The autonomous vehicle can identify an appropriate path through the perceived surrounding environment and navigate along the path with minimal or no human input.

SUMMARY

Example implementations of the present disclosure relate to an evaluation system for analyzing perception outputs of a perception system of an autonomous vehicle. In general, the evaluation system can measure the performance of the perception system by identifying whether the system accurately recognized and tracked objects in an environment. The evaluation system can quantify accuracy by comparison against known label data that identifies ground truth object data (e.g., object type, object position, etc.). Naively measuring accuracy and requiring identity between the perception output and the label can render the problem intractable. To help determine whether a prediction is of sufficient quality, the comparison between the perception outputs and the label data can be multifaceted, with different learned weights applied to adjust the influence of each factor on the comparison output.

In general, the goal of a perception system can be to parse an input scene with sufficient accuracy such that reasonable human drivers would be equipped to respond to the scene if presented with the parsed scene information or the ground truth scene information. In other words, the goal of a perception system can be to capture sufficiently accurate information that would enable the same set of reasonable reactions as would be enabled by ground truth information. For example, a 20 cm error in a lateral lane position of a vehicle at a distance of 200 m may not affect a reasonable human driver's navigation of the scene as compared to the ground truth lane position. The same magnitude error when the vehicle is alongside the driver's position may affect the driver's navigation of the scene as compared to the ground truth lane position.

While human drivers can quickly view a scene and ingest the information that is relevant to their driving task, it is much harder to describe a priori. The boundary between immaterial and material errors can be extremely complex and shaped by numerous parameters. Attempting to hand-tune an exhaustive list of comparison features to determine whether a perception output is "good enough" can be time-consuming, error-prone, or simply intractable.

Advantageously, example evaluation systems according to the present disclosure can provide highly interpretable and efficiently maintainable approaches to learning representations of complex decision boundaries. An example evaluation system can employ a machine-learned model to map the complex decision boundary around valid matches. The machine-learned model can discern between material and immaterial divergences between perception outputs and labels. The machine-learned model can adjust the influence of component divergence values on an ultimate aggregate divergence value that characterizes the overall quality of the match. The example evaluation system can thus be capable of determining that a perception output is materially equivalent to the ground truth label, even if they diverge in aspects that are immaterial to performance.

For example, the evaluation system can process the perception outputs and the label data using multiple divergence metrics configured to characterize aspects in which the perception outputs diverge from the label data. The evaluation system can input data from the perception outputs and data from the labels to the divergence metrics to obtain component divergence values. The evaluation system can form an overall judgment regarding the differences between the perception outputs and the label data using an aggregate divergence value that flows from the various component divergence values. Machine-learned weights can be applied to transform features of the divergences to help quantify the materiality of differences between the perception outputs and the label data. The evaluation system can cause more material divergences to have a greater influence on the aggregate divergence value than less material divergences.

The evaluation system can self-calibrate using a dataset of unit tests. The unit tests can include a variety of data pairs. For example, a unit test can be a pair of perception outputs and label data that are known to be an accurate match (e.g., a sufficiently accurate perception output). A unit test can be a pair of perception outputs and label data that are known to be an inaccurate match (e.g., a perception output that tracks an object with too much error). A unit test can be a pair of perception outputs and label data that are known to be a spurious pairing (e.g., the perception output fails to correspond to any label). The evaluation system can learn values for one or more learnable parameters by fitting its evaluation outputs to the known match labels of the unit tests. For instance, the evaluation system can perform an optimization routine to determine weight values that cause the aggregate divergence values for each unit test to correspond to a range of values associated with the known match label for that test (e.g., above a first threshold for an accurate match, between the first threshold and a second threshold for an inaccurate match, below a third threshold for a spurious pair, etc.).

Using unit tests to self-calibrate can simplify and accelerate the refinement of the evaluation system. For example, if the evaluation system does not correctly match a pair of perception outputs and label data, then that incorrect match can be corrected and added as a unit test. The evaluation system can then re-calibrate over the new set of unit tests. The evaluation system itself can adapt its weighting to refine the decision boundary without requiring extensive manual deconstruction of each failure mode.

To maintain performance on new match pairs (e.g., not in the bank of unit tests), the evaluation system can employ constraints to avoid overfitting. The evaluation system can constrain the weights to a half-space of possible values so that the direction of a particular metric's contribution to the aggregate value is preserved. For instance, the magnitude of an angular rotation between a predicted bounding box and a label bounding box can be a divergence metric, such that a penalty is applied based on the amount of angular misalignment. A weight applied to this divergence metric can be constrained to be positive to prevent the evaluation system from flipping the sign of the weight and treating angular misalignment as a reward.

To facilitate improved interpretability, the evaluation system can constrain the aggregate divergence computation to be linear in its parameters. For instance, this constraint can allow for confirmation that—all else being equal—a change in a component divergence value will cause the aggregate divergence value to change in an expected direction. For instance, while the magnitude of an impact of angular misalignment on an overall aggregate divergence value may be learned implicitly, the evaluation system can support explicit constraints that cause an increase in angular misalignment to—all else being equal—result in a worse match score.

Different divergence metrics can have different importance in different contexts. For instance, angular misalignment of a bounding box can be significant when the object is very close to the autonomous vehicle. However, for distant objects, angular misalignment may not be as important. Using a constant weight for angular misalignment may not reflect variations in the practical value of accuracy in such contexts.

The evaluation system can use context metrics to weight divergence values differently in different contexts. The evaluation system can use context metrics that are also linear in their parameters. The evaluation system can also use learnable parameters in the context metrics to help calibrate the context metrics. The learnable parameters in the context metrics can also be constrained to preserve the intended contribution of the context metric.

To preserve the linearity of the evaluation system in all its parameters, example implementations can determine the aggregate divergence value using a tensor product of one or more linear context metrics and one or more linear divergence metrics. Each component divergence metric or component context metric can be piecewise linear. In this manner, the evaluation system can adapt to different contexts while preserving the interpretability, performance, and efficient optimization of linear systems.

A failure of self-calibration (e.g., in which no solution is found that satisfies all unit tests) can provide a signal that the evaluation system is missing a pertinent divergence metric or is not ingesting some piece of relevant context. For example, a human reviewer may determine that a misalignment error of a bounding box for an emergency vehicle would be an important error, even at long range. The reviewer can add the correct match label (e.g., indicating a failure to match) and add the pair as a unit test. While normally this error might not be as significant, it may be understood that driving behavior can be more strongly affected by the movement of emergency vehicles than non-emergency vehicles. If the evaluation system cannot self-calibrate to fit this new unit test, the failure can be a signal that the evaluation system may benefit from consuming additional context, such as an "active_emer_vehicle" flag that is associated with detected active emergency vehicles.

Additionally, for example, by giving each weight limited power, the evaluation system's self-calibration can have more limited opportunity to overfit by exploiting any given metric's weight to compensate for missing context. For instance, in the above emergency vehicle example, a highly nonlinear weighting configuration could potentially overfit by learning to artificially penalize angular misalignment in a narrow range associated with that single unit test. In this manner, for instance, an explicit failure of the evaluation system to self-calibrate can surface areas for improvement that might be hidden if using more complex configurations.

Example implementations of the present disclosure provide a number of technical effects and advantages. By decomposing the evaluation problem, example evaluation systems can provide improved interpretability of evaluation decisions. By using linear or piecewise linear components subject to sign-flipping constraints, example systems can provide improved reliability, interpretability, and maintainability. This can aid diagnosis of and iterative improvements to the evaluation system itself as well as helping identify aspects of the perception outputs that are leading to evaluation failures. Furthermore, by better modelling the complex decision boundaries for valid perception matches, example evaluation systems can automate review and scoring of test scenarios, thereby allowing significantly higher test volume at much greater speed. This can facilitate robust testing and evaluation of autonomous vehicle perception systems at a scale previously unattainable using traditional techniques which required intense manual scoring and review of test scenarios.

In this manner, for example, example implementations of the present disclosure can improve the operation of autonomous vehicles and advance the field of autonomous navigation as a whole. Example implementations of the present disclosure can lower a cost and increase an efficiency of performing perception system evaluation and validation, unlocking new capacity to quickly refine and develop improved perception systems for controlling autonomous vehicles. In this manner, for instance, example implementations of the present disclosure can accelerate the adoption of autonomous vehicles, thereby facilitating improved traffic flow, decreasing opportunity for human driver error, increasing energy-efficient driving behavior, etc. across greater numbers of vehicles, thereby achieving not only individual performance gains but also significant population-wide improvement.

For example, in an aspect, the present disclosure provides an example method for evaluating a perception system of an autonomous vehicle. In some implementations, the example method includes (a) obtaining an object detection from a perception system that describes an object in an environment of the autonomous vehicle. In some implementations, the example method includes (b) obtaining, from a reference dataset, a label that describes a reference position of the object in the environment. In some implementations, the example method includes (c) determining a plurality of component divergence values respectively for a plurality of divergence metrics, wherein a respective divergence value characterizes a respective difference between the object detection and the label. In some implementations, the example method includes (d) providing the plurality of component divergence values to a machine-learned model to generate a score that indicates an aggregate divergence between the object detection and the label, wherein the machine-learned model includes a plurality of learned parameters defining an influence of the plurality of component divergence values on the score. In some implementations, the example method includes (e) evaluating a quality of a match between the object detection and the label based on the score.

In an aspect, the present disclosure provides an example one or more non-transitory computer-readable media storing instructions that are executable by one or more processors to cause a computing system to perform operations for evaluating a perception system of an autonomous vehicle. In the example one or more non-transitory computer-readable media, the operations include any one or multiple of the implementations of the example method.

In an aspect, the present disclosure provides an example computing system. The example computing system includes one or more processors. The example computing system includes one or more non-transitory computer-readable media storing instructions that are executable by the one or more processors to cause the computing system to perform operations for evaluating a perception system of an autonomous vehicle. In the example computing system, the operations include any one or multiple of the implementations of the example method.

In an aspect, the present disclosure provides an example autonomous vehicle. The example computing system includes one or more processors. The example computing system includes one or more non-transitory computer-readable media storing instructions that are executable by the one or more processors to cause the computing system to perform operations for evaluating a perception system of an autonomous vehicle. In the example computing system, the operations include any one or multiple of the implementations of the example method.

In an aspect, the present disclosure provides an example autonomous vehicle. In some implementations, the example autonomous vehicle includes a perception system that is configured to parse input sensor data descriptive of an environment and output perception data tracking objects in the environment. In some implementations of the example autonomous vehicle, the perception system was validated by (a) obtaining a validation object detection from the perception system that describes a validation object in a validation environment. In some implementations of the example autonomous vehicle, the perception system was validated by (b) obtaining, from a reference dataset, a label that describes a reference position of the validation object in the validation environment. In some implementations of the example autonomous vehicle, the perception system was validated by (c) determining a plurality of component divergence values respectively for a plurality of divergence metrics, wherein a respective divergence value characterizes a respective difference between the validation object detection and the label. In some implementations of the example autonomous vehicle, the perception system was validated by (d) providing the plurality of component divergence values to a machine-learned model to generate a score that indicates an aggregate divergence between the validation object detection and the label, wherein the machine-learned model includes a plurality of learned parameters defining an influence of the plurality of component divergence values on the score. In some implementations of the example autonomous vehicle, the perception system was validated by (e) evaluating a quality of a match between the validation object detection and the label based on the score. In some implementations, the example autonomous vehicle includes one or more processors. In some implementations, the example autonomous vehicle includes one or more non-transitory computer-readable media storing instructions that are executable by the one or more processors to cause the autonomous vehicle control system to perform operations. In some implementations, the operations include receiving a sensor input. In some implementations, the operations include processing the sensor input using the perception system to generate a perception output. In some implementations, the operations include controlling the autonomous vehicle based on the perception output.

Other example aspects of the present disclosure are directed to other systems, methods, vehicles, apparatuses, tangible non-transitory computer-readable media, and devices for performing functions described herein. These and other features, aspects and advantages of various implementations will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of implementations directed to one of ordinary skill in the art are set forth in the specification, which makes reference to the appended figures.

DETAILED DESCRIPTION

The following describes the technology of this disclosure within the context of an autonomous vehicle for example purposes only. As described herein, the technology described herein is not limited to an autonomous vehicle and can be implemented for or within other autonomous platforms and other computing systems.

Figure 1:
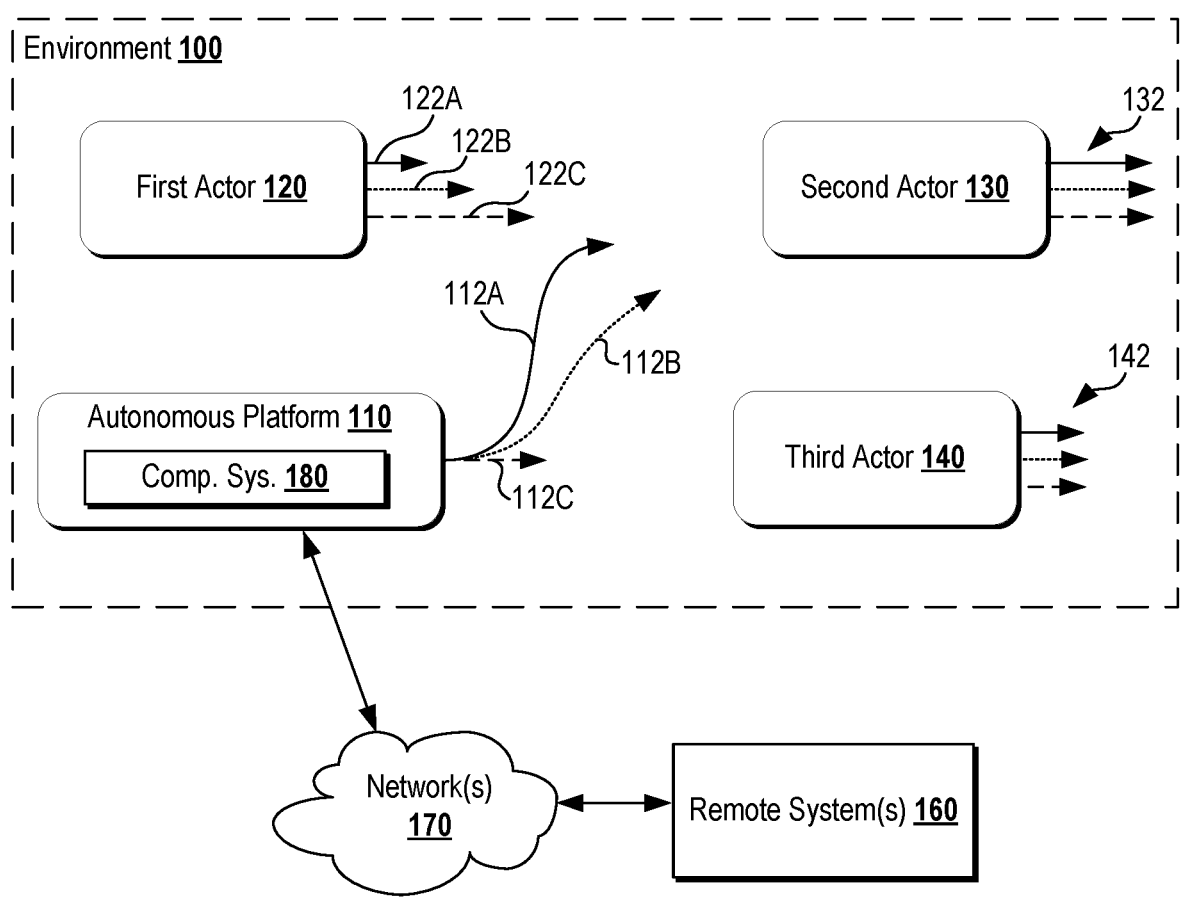
FIG. 1 is a block diagram of an example operational scenario, according to some implementations of the present disclosure.

With reference to FIGS. 1-15, example implementations of the present disclosure are discussed in further detail. FIG. 1 is a block diagram of an example operational scenario, according to some implementations of the present disclosure. In the example operational scenario, an environment 100 contains an autonomous platform 110 and a number of objects, including first actor 120, second actor 130, and third actor 140. In the example operational scenario, the autonomous platform 110 can move through the environment 100 and interact with the object(s) that are located within the environment 100 (e.g., first actor 120, second actor 130, third actor 140, etc.). The autonomous platform 110 can optionally be configured to communicate with remote system(s) 160 through network(s) 170.

The environment 100 may be or include an indoor environment (e.g., within one or more facilities, etc.) or an outdoor environment. An indoor environment, for example, may be an environment enclosed by a structure such as a building (e.g., a service depot, maintenance location, manufacturing facility, etc.). An outdoor environment, for example, may be one or more areas in the outside world such as, for example, one or more rural areas (e.g., with one or more rural travel ways, etc.), one or more urban areas (e.g., with one or more city travel ways, highways, etc.), one or more suburban areas (e.g., with one or more suburban travel ways, etc.), or other outdoor environments.

The autonomous platform 110 may be any type of platform configured to operate within the environment 100. For example, the autonomous platform 110 may be a vehicle configured to autonomously perceive and operate within the environment 100. The vehicles may be a ground-based autonomous vehicle such as, for example, an autonomous car, truck, van, etc. The autonomous platform 110 may be an autonomous vehicle that can control, be connected to, or be otherwise associated with implements, attachments, and/or accessories for transporting people or cargo. This can include, for example, an autonomous tractor optionally coupled to a cargo trailer. Additionally, or alternatively, the autonomous platform 110 may be any other type of vehicle such as one or more aerial vehicles, water-based vehicles, space-based vehicles, other ground-based vehicles, etc.

The autonomous platform 110 may be configured to communicate with the remote system(s) 160. For instance, the remote system(s) 160 can communicate with the autonomous platform 110 for assistance (e.g., navigation assistance, situation response assistance, etc.), control (e.g., fleet management, remote operation, etc.), maintenance (e.g., updates, monitoring, etc.), or other local or remote tasks. In some implementations, the remote system(s) 160 can provide data indicating tasks that the autonomous platform 110 should perform. For example, as further described herein, the remote system(s) 160 can provide data indicating that the autonomous platform 110 is to perform a trip/service such as a user transportation trip/service, delivery trip/service (e.g., for cargo, freight, items), etc.

The autonomous platform 110 can communicate with the remote system(s) 160 using the network(s) 170. The network(s) 170 can facilitate the transmission of signals (e.g., electronic signals, etc.) or data (e.g., data from a computing device, etc.) and can include any combination of various wired (e.g., twisted pair cable, etc.) or wireless communication mechanisms (e.g., cellular, wireless, satellite, microwave, radio frequency, etc.) or any desired network topology (or topologies). For example, the network(s) 170 can include a local area network (e.g., intranet, etc.), a wide area network (e.g., the Internet, etc.), a wireless LAN network (e.g., through Wi-Fi, etc.), a cellular network, a SATCOM network, a VHF network, a HF network, a WiMAX based network, or any other suitable communications network (or combination thereof) for transmitting data to or from the autonomous platform 110.

As shown for example in FIG. 1, environment 100 can include one or more objects. The object(s) may be objects not in motion or not predicted to move ("static objects") or object(s) in motion or predicted to be in motion ("dynamic objects" or "actors"). In some implementations, the environment 100 can include any number of actor(s) such as, for example, one or more pedestrians, animals, vehicles, etc. The actor(s) can move within the environment according to one or more actor trajectories. For instance, the first actor 120 can move along any one of the first actor trajectories 122A-C, the second actor 130 can move along any one of the second actor trajectories 132, the third actor 140 can move along any one of the third actor trajectories 142, etc.

As further described herein, the autonomous platform 110 can utilize its autonomy system(s) to detect these actors (and their movement) and plan its motion to navigate through the environment 100 according to one or more platform trajectories 112A-C. The autonomous platform 110 can include onboard computing system(s) 180. The onboard computing system(s) 180 can include one or more processors and one or more memory devices. The one or more memory devices can store instructions executable by the one or more processors to cause the one or more processors to perform operations or functions associated with the autonomous platform 110, including implementing its autonomy system(s).

Figure 2:
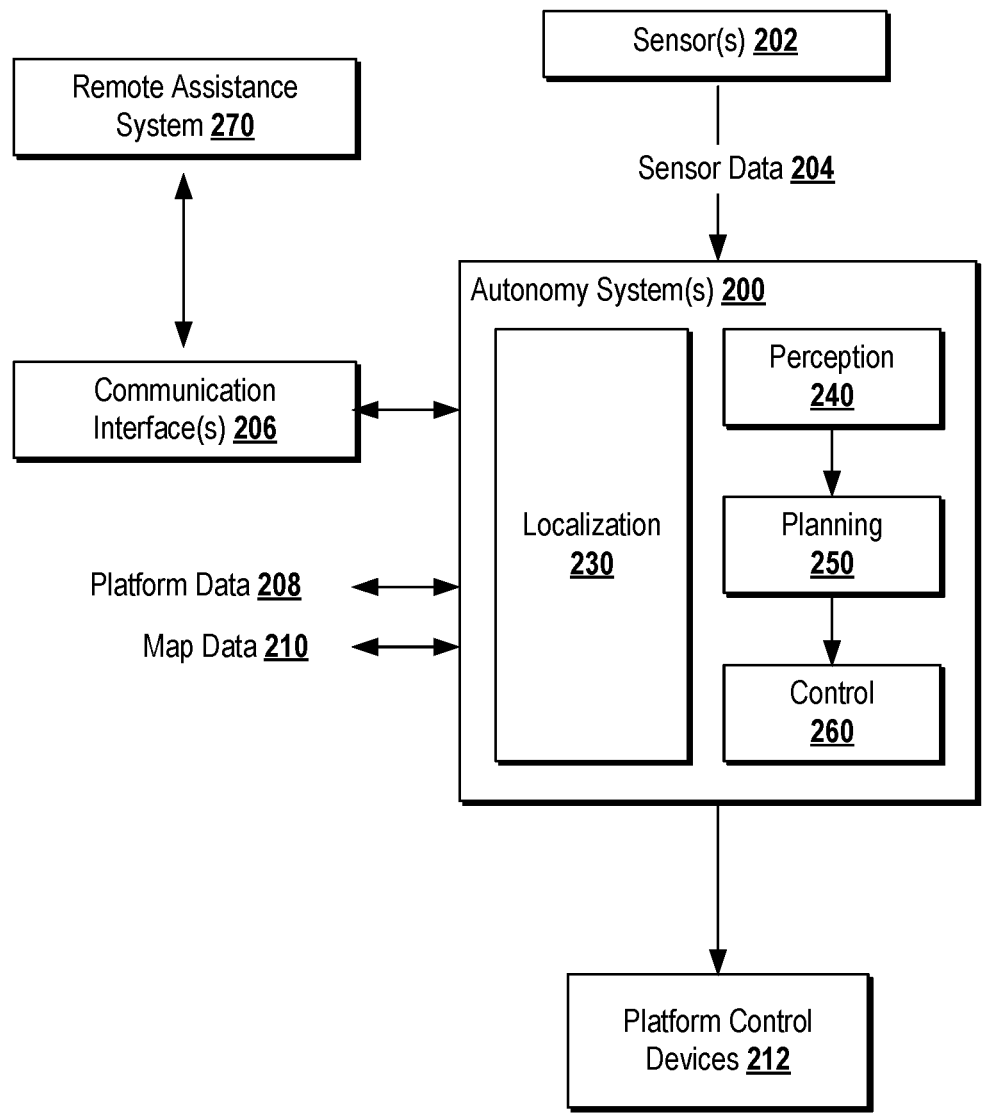
FIG. 2 is a block diagram of an example system, according to some implementations of the present disclosure.

FIG. 2 is a block diagram of an example autonomy system 200 for an autonomous platform, according to some implementations of the present disclosure. In some implementations, the autonomy system 200 can be implemented by a computing system of the autonomous platform (e.g., the onboard computing system(s) 180 of the autonomous platform 110). The autonomy system 200 can operate to obtain inputs from sensor(s) 202 or other input devices. In some implementations, the autonomy system 200 can additionally obtain platform data 208 (e.g., map data 210) from local or remote storage. The autonomy system 200 can generate control outputs for controlling the autonomous platform (e.g., through platform control devices 212, etc.) based on sensor data 204, map data 210, or other data. The autonomy system 200 may include different subsystems for performing various autonomy operations. The subsystems may include a localization system 230, a perception system 240, a planning system 250, and a control system 260. The localization system 230 can determine the location of the autonomous platform within its environment; the perception system 240 can detect, classify, and track objects and actors in the environment; the planning system 250 can determine a trajectory for the autonomous platform; and the control system 260 can translate the trajectory into vehicle controls for controlling the autonomous platform. The autonomy system 200 can be implemented by one or more onboard computing system(s). The subsystems can include one or more processors and one or more memory devices. The one or more memory devices can store instructions executable by the one or more processors to cause the one or more processors to perform operations or functions associated with the subsystems. The computing resources of the autonomy system 200 can be shared among its subsystems, or a subsystem can have a set of dedicated computing resources.

In some implementations, the autonomy system 200 can be implemented for or by an autonomous vehicle (e.g., a ground-based autonomous vehicle). The autonomy system 200 can perform various processing techniques on inputs (e.g., the sensor data 204, the map data 210) to perceive and understand the vehicle's surrounding environment and generate an appropriate set of control outputs to implement a vehicle motion plan (e.g., including one or more trajectories) for traversing the vehicle's surrounding environment (e.g., environment 100 of FIG. 1, etc.). In some implementations, an autonomous vehicle implementing the autonomy system 200 can drive, navigate, operate, etc. with minimal or no interaction from a human operator (e.g., driver, pilot, etc.).

In some implementations, the autonomous platform can be configured to operate in a plurality of operating modes. For instance, the autonomous platform can be configured to operate in a fully autonomous (e.g., self-driving, etc.) operating mode in which the autonomous platform is controllable without user input (e.g., can drive and navigate with no input from a human operator present in the autonomous vehicle or remote from the autonomous vehicle, etc.). The autonomous platform can operate in a semi-autonomous operating mode in which the autonomous platform can operate with some input from a human operator present in the autonomous platform (or a human operator that is remote from the autonomous platform). In some implementations, the autonomous platform can enter into a manual operating mode in which the autonomous platform is fully controllable by a human operator (e.g., human driver, etc.) and can be prohibited or disabled (e.g., temporary, permanently, etc.) from performing autonomous navigation (e.g., autonomous driving, etc.). The autonomous platform can be configured to operate in other modes such as, for example, park or sleep modes (e.g., for use between tasks such as waiting to provide a trip/service, recharging, etc.). In some implementations, the autonomous platform can implement vehicle operating assistance technology (e.g., collision mitigation system, power assist steering, etc.), for example, to help assist the human operator of the autonomous platform (e.g., while in a manual mode, etc.).

Autonomy system 200 can be located onboard (e.g., on or within) an autonomous platform and can be configured to operate the autonomous platform in various environments. The environment may be a real-world environment or a simulated environment. In some implementations, one or more simulation computing devices can simulate one or more of: the sensors 202, the sensor data 204, communication interface(s) 206, the platform data 208, or the platform control devices 212 for simulating operation of the autonomy system 200.

In some implementations, the autonomy system 200 can communicate with one or more networks or other systems with the communication interface(s) 206. The communication interface(s) 206 can include any suitable components for interfacing with one or more network(s) (e.g., the network(s) 170 of FIG. 1, etc.), including, for example, transmitters, receivers, ports, controllers, antennas, or other suitable components that can help facilitate communication. In some implementations, the communication interface(s) 206 can include a plurality of components (e.g., antennas, transmitters, or receivers, etc.) that allow it to implement and utilize various communication techniques (e.g., multiple-input, multiple-output (MIMO) technology, etc.).

In some implementations, the autonomy system 200 can use the communication interface(s) 206 to communicate with one or more computing devices that are remote from the autonomous platform (e.g., the remote system(s) 160) over one or more network(s) (e.g., the network(s) 170). For instance, in some examples, one or more inputs, data, or functionalities of the autonomy system 200 can be supplemented or substituted by a remote system communicating over the communication interface(s) 206. For instance, in some implementations, the map data 210 can be downloaded over a network to a remote system using the communication interface(s) 206. In some examples, one or more of localization system 230, perception system 240, planning system 250, or control system 260 can be updated, influenced, nudged, communicated with, etc. by a remote system for assistance, maintenance, situational response override, management, etc.

The sensor(s) 202 can be located onboard the autonomous platform. In some implementations, the sensor(s) 202 can include one or more types of sensor(s). For instance, one or more sensors can include image capturing device(s) (e.g., visible spectrum cameras, infrared cameras, etc.). Additionally, or alternatively, the sensor(s) 202 can include one or more depth capturing device(s). For example, the sensor(s) 202 can include one or more Light Detection and Ranging (LIDAR) sensor(s) or Radio Detection and Ranging (RADAR) sensor(s). The sensor(s) 202 can be configured to generate point data descriptive of at least a portion of a three-hundred-and-sixty-degree view of the surrounding environment. The point data can be point cloud data (e.g., three-dimensional LIDAR point cloud data, RADAR point cloud data). In some implementations, one or more of the sensor(s) 202 for capturing depth information can be fixed to a rotational device in order to rotate the sensor(s) 202 about an axis. The sensor(s) 202 can be rotated about the axis while capturing data in interval sector packets descriptive of different portions of a three-hundred-and-sixty-degree view of a surrounding environment of the autonomous platform. In some implementations, one or more of the sensor(s) 202 for capturing depth information can be solid state.

The sensor(s) 202 can be configured to capture the sensor data 204 indicating or otherwise being associated with at least a portion of the environment of the autonomous platform. The sensor data 204 can include image data (e.g., 2D camera data, video data, etc.), RADAR data, LIDAR data (e.g., 3D point cloud data, etc.), audio data, or other types of data. In some implementations, the autonomy system 200 can obtain input from additional types of sensors, such as inertial measurement units (IMUs), altimeters, inclinometers, odometry devices, location or positioning devices (e.g., GPS, compass), wheel encoders, or other types of sensors. In some implementations, the autonomy system 200 can obtain sensor data 204 associated with particular component(s) or system(s) of an autonomous platform. This sensor data 204 can indicate, for example, wheel speed, component temperatures, steering angle, cargo or passenger status, etc. In some implementations, the autonomy system 200 can obtain sensor data 204 associated with ambient conditions, such as environmental or weather conditions. In some implementations, the sensor data 204 can include multi-modal sensor data. The multi-modal sensor data can be obtained by at least two different types of sensor(s) (e.g., of the sensors 202) and can indicate static object(s) or actor(s) within an environment of the autonomous platform. The multi-modal sensor data can include at least two types of sensor data (e.g., camera and LIDAR data). In some implementations, the autonomous platform can utilize the sensor data 204 for sensors that are remote from (e.g., offboard) the autonomous platform. This can include for example, sensor data 204 captured by a different autonomous platform.

The autonomy system 200 can obtain the map data 210 associated with an environment in which the autonomous platform was, is, or will be located. The map data 210 can provide information about an environment or a geographic area. For example, the map data 210 can provide information regarding the identity and location of different travel ways (e.g., roadways, etc.), travel way segments (e.g., road segments, etc.), buildings, or other items or objects (e.g., lampposts, crosswalks, curbs, etc.); the location and directions of boundaries or boundary markings (e.g., the location and direction of traffic lanes, parking lanes, turning lanes, bicycle lanes, other lanes, etc.); traffic control data (e.g., the location and instructions of signage, traffic lights, other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicating an ideal vehicle path such as along the center of a certain lane, etc.); or any other map data that provides information that assists an autonomous platform in understanding its surrounding environment and its relationship thereto. In some implementations, the map data 210 can include high-definition map information. Additionally, or alternatively, the map data 210 can include sparse map data (e.g., lane graphs, etc.). In some implementations, the sensor data 204 can be fused with or used to update the map data 210 in real-time.

The autonomy system 200 can include the localization system 230, which can provide an autonomous platform with an understanding of its location and orientation in an environment. In some examples, the localization system 230 can support one or more other subsystems of the autonomy system 200, such as by providing a unified local reference frame for performing, e.g., perception operations, planning operations, or control operations.

In some implementations, the localization system 230 can determine a current position of the autonomous platform. A current position can include a global position (e.g., respecting a georeferenced anchor, etc.) or relative position (e.g., respecting objects in the environment, etc.). The localization system 230 can generally include or interface with any device or circuitry for analyzing a position or change in position of an autonomous platform (e.g., autonomous ground-based vehicle, etc.). For example, the localization system 230 can determine position by using one or more of: inertial sensors (e.g., inertial measurement unit(s), etc.), a satellite positioning system, radio receivers, networking devices (e.g., based on IP address, etc.), triangulation or proximity to network access points or other network components (e.g., cellular towers, Wi-Fi access points, etc.), or other suitable techniques. The position of the autonomous platform can be used by various subsystems of the autonomy system 200 or provided to a remote computing system (e.g., using the communication interface(s) 206).

In some implementations, the localization system 230 can register relative positions of elements of a surrounding environment of an autonomous platform with recorded positions in the map data 210. For instance, the localization system 230 can process the sensor data 204 (e.g., LIDAR data, RADAR data, camera data, etc.) for aligning or otherwise registering to a map of the surrounding environment (e.g., from the map data 210) to understand the autonomous platform's position within that environment. Accordingly, in some implementations, the autonomous platform can identify its position within the surrounding environment (e.g., across six axes, etc.) based on a search over the map data 210. In some implementations, given an initial location, the localization system 230 can update the autonomous platform's location with incremental re-alignment based on recorded or estimated deviations from the initial location. In some implementations, a position can be registered directly within the map data 210.

In some implementations, the map data 210 can include a large volume of data subdivided into geographic tiles, such that a desired region of a map stored in the map data 210 can be reconstructed from one or more tiles. For instance, a plurality of tiles selected from the map data 210 can be stitched together by the autonomy system 200 based on a position obtained by the localization system 230 (e.g., a number of tiles selected in the vicinity of the position).

In some implementations, the localization system 230 can determine positions (e.g., relative or absolute) of one or more attachments or accessories for an autonomous platform. For instance, an autonomous platform can be associated with a cargo platform, and the localization system 230 can provide positions of one or more points on the cargo platform. For example, a cargo platform can include a trailer or other device towed or otherwise attached to or manipulated by an autonomous platform, and the localization system 230 can provide for data describing the position (e.g., absolute, relative, etc.) of the autonomous platform as well as the cargo platform. Such information can be obtained by the other autonomy systems to help operate the autonomous platform.

The autonomy system 200 can include the perception system 240, which can allow an autonomous platform to detect, classify, and track objects and actors in its environment. Environmental features or objects perceived within an environment can be those within the field of view of the sensor(s) 202 or predicted to be occluded from the sensor(s) 202. This can include object(s) not in motion or not predicted to move (static objects) or object(s) in motion or predicted to be in motion (dynamic objects/actors).

The perception system 240 can determine one or more states (e.g., current or past state(s), etc.) of one or more objects that are within a surrounding environment of an autonomous platform. For example, state(s) can describe (e.g., for a given time, time period, etc.) an estimate of an object's current or past location (also referred to as position); current or past speed/velocity; current or past acceleration; current or past heading; current or past orientation; size/footprint (e.g., as represented by a bounding shape, object highlighting, etc.); classification (e.g., pedestrian class vs. vehicle class vs. bicycle class, etc.); the uncertainties associated therewith; or other state information. In some implementations, the perception system 240 can determine the state(s) using one or more algorithms or machine-learned models configured to identify/classify objects based on inputs from the sensor(s) 202. The perception system can use different modalities of the sensor data 204 to generate a representation of the environment to be processed by the one or more algorithms or machine-learned models. In some implementations, state(s) for one or more identified or unidentified objects can be maintained and updated over time as the autonomous platform continues to perceive or interact with the objects (e.g., maneuver with or around, yield to, etc.). In this manner, the perception system 240 can provide an understanding about a current state of an environment (e.g., including the objects therein, etc.) informed by a record of prior states of the environment (e.g., including movement histories for the objects therein). Such information can be helpful as the autonomous platform plans its motion through the environment.

The autonomy system 200 can include the planning system 250, which can be configured to determine how the autonomous platform is to interact with and move within its environment. The planning system 250 can determine one or more motion plans for an autonomous platform. A motion plan can include one or more trajectories (e.g., motion trajectories) that indicate a path for an autonomous platform to follow. A trajectory can be of a certain length or time range. The length or time range can be defined by the computational planning horizon of the planning system 250. A motion trajectory can be defined by one or more waypoints (with associated coordinates). The waypoint(s) can be future location(s) for the autonomous platform. The motion plans can be continuously generated, updated, and considered by the planning system 250.

The motion planning system 250 can determine a strategy for the autonomous platform. A strategy may be a set of discrete decisions (e.g., yield to actor, reverse yield to actor, merge, lane change) that the autonomous platform makes. The strategy may be selected from a plurality of potential strategies. The selected strategy may be a lowest cost strategy as determined by one or more cost functions. The cost functions may, for example, evaluate the probability of a collision with another actor or object.

The planning system 250 can determine a desired trajectory for executing a strategy. For instance, the planning system 250 can obtain one or more trajectories for executing one or more strategies. The planning system 250 can evaluate trajectories or strategies (e.g., with scores, costs, rewards, constraints, etc.) and rank them. For instance, the planning system 250 can use forecasting output(s) that indicate interactions (e.g., proximity, intersections, etc.) between trajectories for the autonomous platform and one or more objects to inform the evaluation of candidate trajectories or strategies for the autonomous platform. In some implementations, the planning system 250 can utilize static cost(s) to evaluate trajectories for the autonomous platform (e.g., "avoid lane boundaries," "minimize jerk," etc.). Additionally, or alternatively, the planning system 250 can utilize dynamic cost(s) to evaluate the trajectories or strategies for the autonomous platform based on forecasted outcomes for the current operational scenario (e.g., forecasted trajectories or strategies leading to interactions between actors, forecasted trajectories or strategies leading to interactions between actors and the autonomous platform, etc.). The planning system 250 can rank trajectories based on one or more static costs, one or more dynamic costs, or a combination thereof. The planning system 250 can select a motion plan (and a corresponding trajectory) based on a ranking of a plurality of candidate trajectories. In some implementations, the planning system 250 can select a highest ranked candidate, or a highest ranked feasible candidate.

The planning system 250 can then validate the selected trajectory against one or more constraints before the trajectory is executed by the autonomous platform.

To help with its motion planning decisions, the planning system 250 can be configured to perform a forecasting function. The planning system 250 can forecast future state(s) of the environment. This can include forecasting the future state(s) of other actors in the environment. In some implementations, the planning system 250 can forecast future state(s) based on current or past state(s) (e.g., as developed or maintained by the perception system 240). In some implementations, future state(s) can be or include forecasted trajectories (e.g., positions over time) of the objects in the environment, such as other actors. In some implementations, one or more of the future state(s) can include one or more probabilities associated therewith (e.g., marginal probabilities, conditional probabilities). For example, the one or more probabilities can include one or more probabilities conditioned on the strategy or trajectory options available to the autonomous platform. Additionally, or alternatively, the probabilities can include probabilities conditioned on trajectory options available to one or more other actors.

In some implementations, the planning system 250 can perform interactive forecasting. The planning system 250 can determine a motion plan for an autonomous platform with an understanding of how forecasted future states of the environment can be affected by execution of one or more candidate motion plans.

By way of example, with reference again to FIG. 1, the autonomous platform 110 can determine candidate motion plans corresponding to a set of platform trajectories 112A-C that respectively correspond to the first actor trajectories 122A-C for the first actor 120, trajectories 132 for the second actor 130, and trajectories 142 for the third actor 140 (e.g., with respective trajectory correspondence indicated with matching line styles). The autonomous platform 110 can evaluate each of the potential platform trajectories and predict its impact on the environment.

For example, the autonomous platform 110 (e.g., using its autonomy system 200) can determine that a platform trajectory 112A would move the autonomous platform 110 more quickly into the area in front of the first actor 120 and is likely to cause the first actor 120 to decrease its forward speed and yield more quickly to the autonomous platform 110 in accordance with a first actor trajectory 122A.

Additionally or alternatively, the autonomous platform 110 can determine that a platform trajectory 112B would move the autonomous platform 110 gently into the area in front of the first actor 120 and, thus, may cause the first actor 120 to slightly decrease its speed and yield slowly to the autonomous platform 110 in accordance with a first actor trajectory 122B.

Additionally or alternatively, the autonomous platform 110 can determine that a platform trajectory 112C would cause the autonomous vehicle to remain in a parallel alignment with the first actor 120 and, thus, the first actor 120 is unlikely to yield any distance to the autonomous platform 110 in accordance with first actor trajectory 122C.

Based on comparison of the forecasted scenarios to a set of desired outcomes (e.g., by scoring scenarios based on a cost or reward), the planning system 250 can select a motion plan (and its associated trajectory) in view of the autonomous platform's interaction with the environment 100. In this manner, for example, the autonomous platform 110 can interleave its forecasting and motion planning functionality.

To implement selected motion plan(s), the autonomy system 200 can include a control system 260 (e.g., a vehicle control system). Generally, the control system 260 can provide an interface between the autonomy system 200 and the platform control devices 212 for implementing the strategies and motion plan(s) generated by the planning system 250. For instance, control system 260 can implement the selected motion plan/trajectory to control the autonomous platform's motion through its environment by following the selected trajectory (e.g., the waypoints included therein). The control system 260 can, for example, translate a motion plan into instructions for the appropriate platform control devices 212 (e.g., acceleration control, brake control, steering control, etc.). By way of example, the control system 260 can translate a selected motion plan into instructions to adjust a steering component (e.g., a steering angle)

by a certain number of degrees, apply a certain magnitude of braking force, increase/decrease speed, etc. In some implementations, the control system 260 can communicate with the platform control devices 212 through communication channels including, for example, one or more data buses (e.g., controller area network (CAN), etc.), onboard diagnostics connectors (e.g., OBD-II, etc.), or a combination of wired or wireless communication links. The platform control devices 212 can send or obtain data, messages, signals, etc. to or from the autonomy system 200 (or vice versa) through the communication channel(s).

The autonomy system 200 can receive, through communication interface(s) 206, assistive signal(s) from remote assistance system 270. Remote assistance system 270 can communicate with the autonomy system 200 over a network (e.g., as a remote system 160 over network 170). In some implementations, the autonomy system 200 can initiate a communication session with the remote assistance system 270. For example, the autonomy system 200 can initiate a session based on or in response to a trigger. In some implementations, the trigger may be an alert, an error signal, a map feature, a request, a location, a traffic condition, a road condition, etc.

After initiating the session, the autonomy system 200 can provide context data to the remote assistance system 270. The context data may include sensor data 204 and state data of the autonomous platform. For example, the context data may include a live camera feed from a camera of the autonomous platform and the autonomous platform's current speed. An operator (e.g., human operator) of the remote assistance system 270 can use the context data to select assistive signals. The assistive signal(s) can provide values or adjustments for various operational parameters or characteristics for the autonomy system 200. For instance, the assistive signal(s) can include way points (e.g., a path around an obstacle, lane change, etc.), velocity or acceleration profiles (e.g., speed limits, etc.), relative motion instructions (e.g., convoy formation, etc.), operational characteristics (e.g., use of auxiliary systems, reduced energy processing modes, etc.), or other signals to assist the autonomy system 200.

Autonomy system 200 can use the assistive signal(s) for input into one or more autonomy subsystems for performing autonomy functions. For instance, the planning subsystem 250 can receive the assistive signal(s) as an input for generating a motion plan. For example, assistive signal(s) can include constraints for generating a motion plan. Additionally, or alternatively, assistive signal(s) can include cost or reward adjustments for influencing motion planning by the planning subsystem 250. Additionally, or alternatively, assistive signal(s) can be considered by the autonomy system 200 as suggestive inputs for consideration in addition to other received data (e.g., sensor inputs, etc.).

The autonomy system 200 may be platform agnostic, and the control system 260 can provide control instructions to platform control devices 212 for a variety of different platforms for autonomous movement (e.g., a plurality of different autonomous platforms fitted with autonomous control systems). This can include a variety of different types of autonomous vehicles (e.g., sedans, vans, SUVs, trucks, electric vehicles, combustion power vehicles, etc.) from a variety of different manufacturers/developers that operate in various different environments and, in some implementations, perform one or more vehicle services.

Figure 3A:
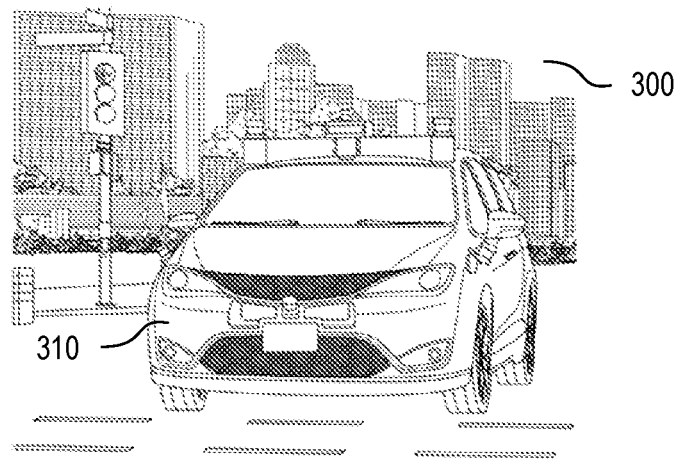
FIG. 3A is a representation of an example operational environment, according to some implementations of the present disclosure.

For example, with reference to FIG. 3A, an operational environment can include a dense environment 300. An autonomous platform can include an autonomous vehicle 310 controlled by the autonomy system 200. In some implementations, the autonomous vehicle 310 can be configured for maneuverability in a dense environment, such as with a configured wheelbase or other specifications. In some implementations, the autonomous vehicle 310 can be configured for transporting cargo or passengers. In some implementations, the autonomous vehicle 310 can be configured to transport numerous passengers (e.g., a passenger van, a shuttle, a bus, etc.). In some implementations, the autonomous vehicle 310 can be configured to transport cargo, such as large quantities of cargo (e.g., a truck, a box van, a step van, etc.) or smaller cargo (e.g., food, personal packages, etc.).

Figure 3B:
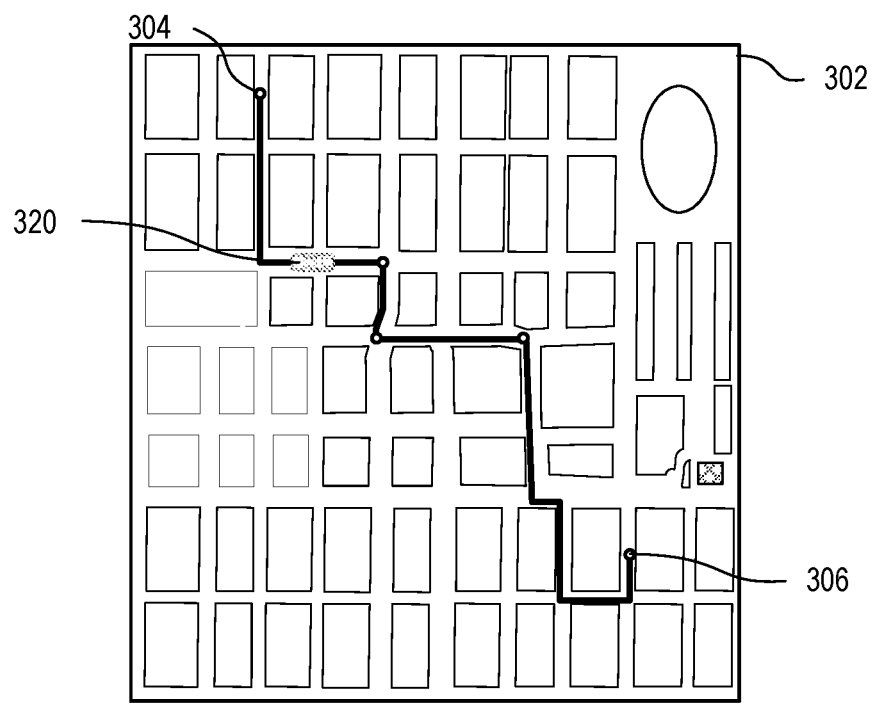
FIG. 3B is a representation of an example map of an operational environment, according to some implementations of the present disclosure.

With reference to FIG. 3B, a selected overhead view 302 of the dense environment 300 is shown overlaid with an example trip/service between a first location 304 and a second location 306. The example trip/service can be assigned, for example, to an autonomous vehicle 320 by a remote computing system. The autonomous vehicle 320 can be, for example, the same type of vehicle as autonomous vehicle 310. The example trip/service can include transporting passengers or cargo between the first location 304 and the second location 306. In some implementations, the example trip/service can include travel to or through one or more intermediate locations, such as to onload or offload passengers or cargo. In some implementations, the example trip/service can be prescheduled (e.g., for regular traversal, such as on a transportation schedule). In some implementations, the example trip/service can be on-demand (e.g., as requested by or for performing a taxi, rideshare, ride hailing, courier, delivery service, etc.).

Figure 3C:
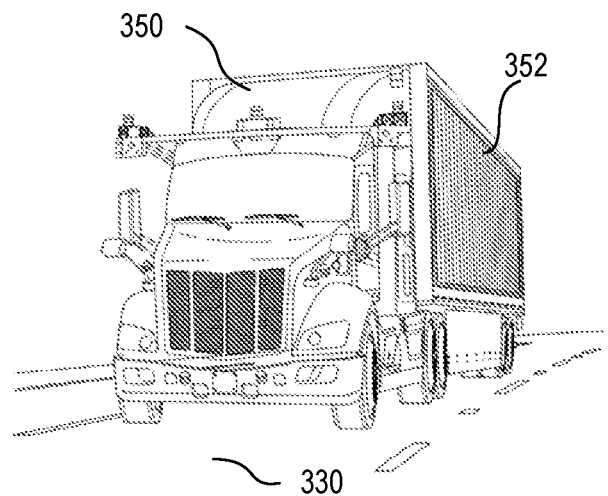
FIG. 3C is a representation of an example operational environment, according to some implementations of the present disclosure.

With reference to FIG. 3C, in another example, an operational environment can include an open travel way environment 330. An autonomous platform can include an autonomous vehicle 350 controlled by the autonomy system 200. This can include an autonomous tractor for an autonomous truck. In some implementations, the autonomous vehicle 350 can be configured for high payload transport (e.g., transporting freight or other cargo or passengers in quantity), such as for long distance, high payload transport. For instance, the autonomous vehicle 350 can include one or more cargo platform attachments such as a trailer 352. Although depicted as a towed attachment in FIG. 3C, in some implementations one or more cargo platforms can be integrated into (e.g., attached to the chassis of, etc.) the autonomous vehicle 350 (e.g., as in a box van, step van, etc.).

Figure 3D:
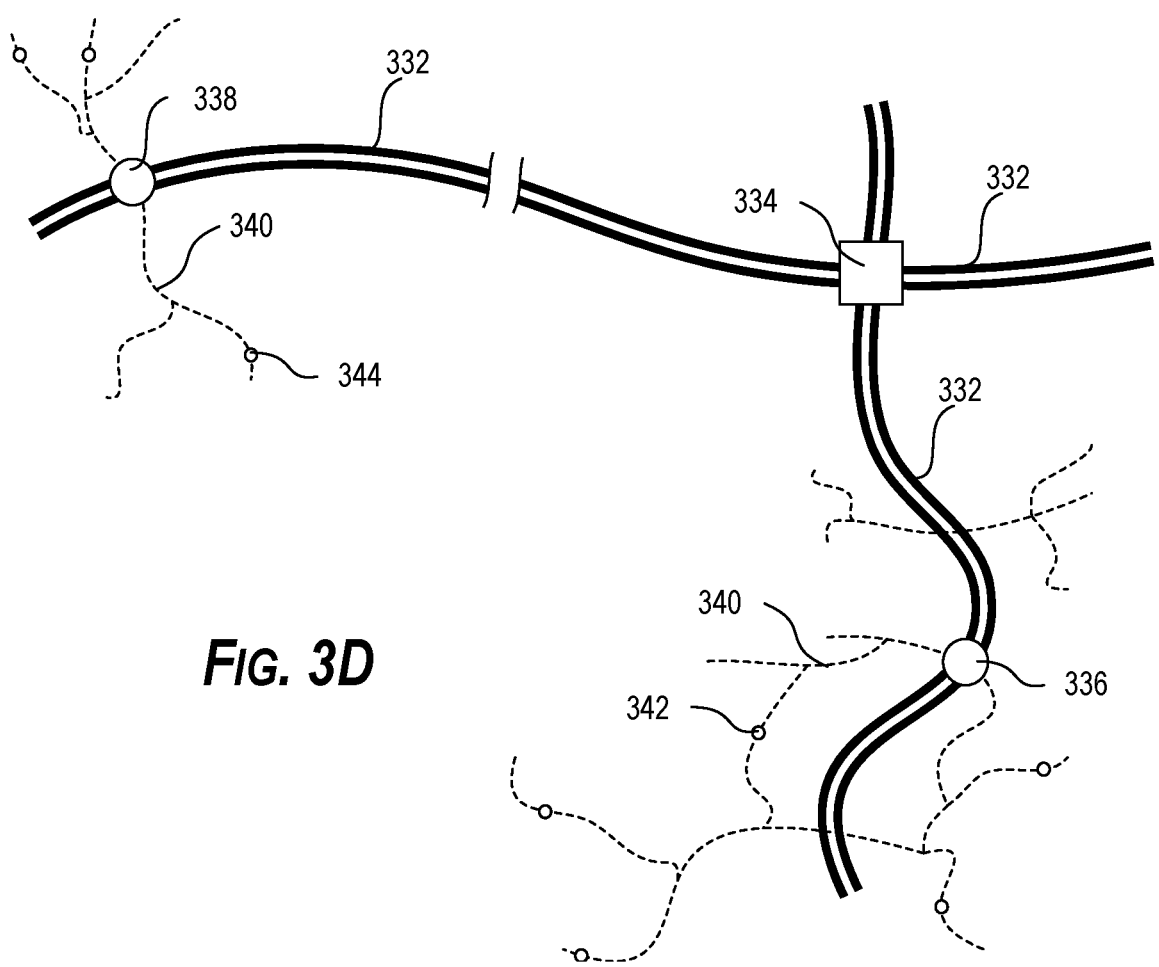
FIG. 3D is a representation of an example map of an operational environment, according to some implementations of the present disclosure.

With reference to FIG. 3D, a selected overhead view of open travel way environment 330 is shown, including travel ways 332, an interchange 334, transfer hubs 336 and 338, access travel ways 340, and locations 342 and 344. In some implementations, an autonomous vehicle (e.g., the autonomous vehicle 310 or the autonomous vehicle 350) can be assigned an example trip/service to traverse the one or more travel ways 332 (optionally connected by the interchange 334) to transport cargo between the transfer hub 336 and the transfer hub 338. For instance, in some implementations, the example trip/service includes a cargo delivery/transport service, such as a freight delivery/transport service. The example trip/service can be assigned by a remote computing system. In some implementations, the transfer hub 336 can be an origin point for cargo (e.g., a depot, a warehouse, a facility, etc.) and the transfer hub 338 can be a destination point for cargo (e.g., a retailer, etc.). However, in some implementations, the transfer hub 336 can be an intermediate point along a cargo item's ultimate journey between its respective origin and its respective destination. For instance, a cargo item's origin can be situated along the access travel ways 340 at the location 342. The cargo item can accordingly be transported to transfer hub 336 (e.g., by a human-driven vehicle, by the autonomous vehicle 310, etc.) for staging. At the transfer hub 336, various cargo items can be grouped or staged for longer distance transport over the travel ways 332.

In some implementations of an example trip/service, a group of staged cargo items can be loaded onto an autonomous vehicle (e.g., the autonomous vehicle 350) for transport to one or more other transfer hubs, such as the transfer hub 338. For instance, although not depicted, it is to be understood that the open travel way environment 330 can include more transfer hubs than the transfer hubs 336 and 338 and can include more travel ways 332 interconnected by more interchanges 334. A simplified map is presented here for purposes of clarity only. In some implementations, one or more cargo items transported to the transfer hub 338 can be distributed to one or more local destinations (e.g., by a human-driven vehicle, by the autonomous vehicle 310, etc.), such as along the access travel ways 340 to the location 344. In some implementations, the example trip/service can be prescheduled (e.g., for regular traversal, such as on a transportation schedule). In some implementations, the example trip/service can be on-demand (e.g., as requested by or for performing a chartered passenger transport or freight delivery service).

To improve the performance of an autonomous platform, such as an autonomous vehicle controlled at least in part using autonomy system 200 (e.g., the autonomous vehicles 310 or 350), the autonomous platform can implement validation techniques described herein can be implemented according to example aspects of the present disclosure.

Figure 4:
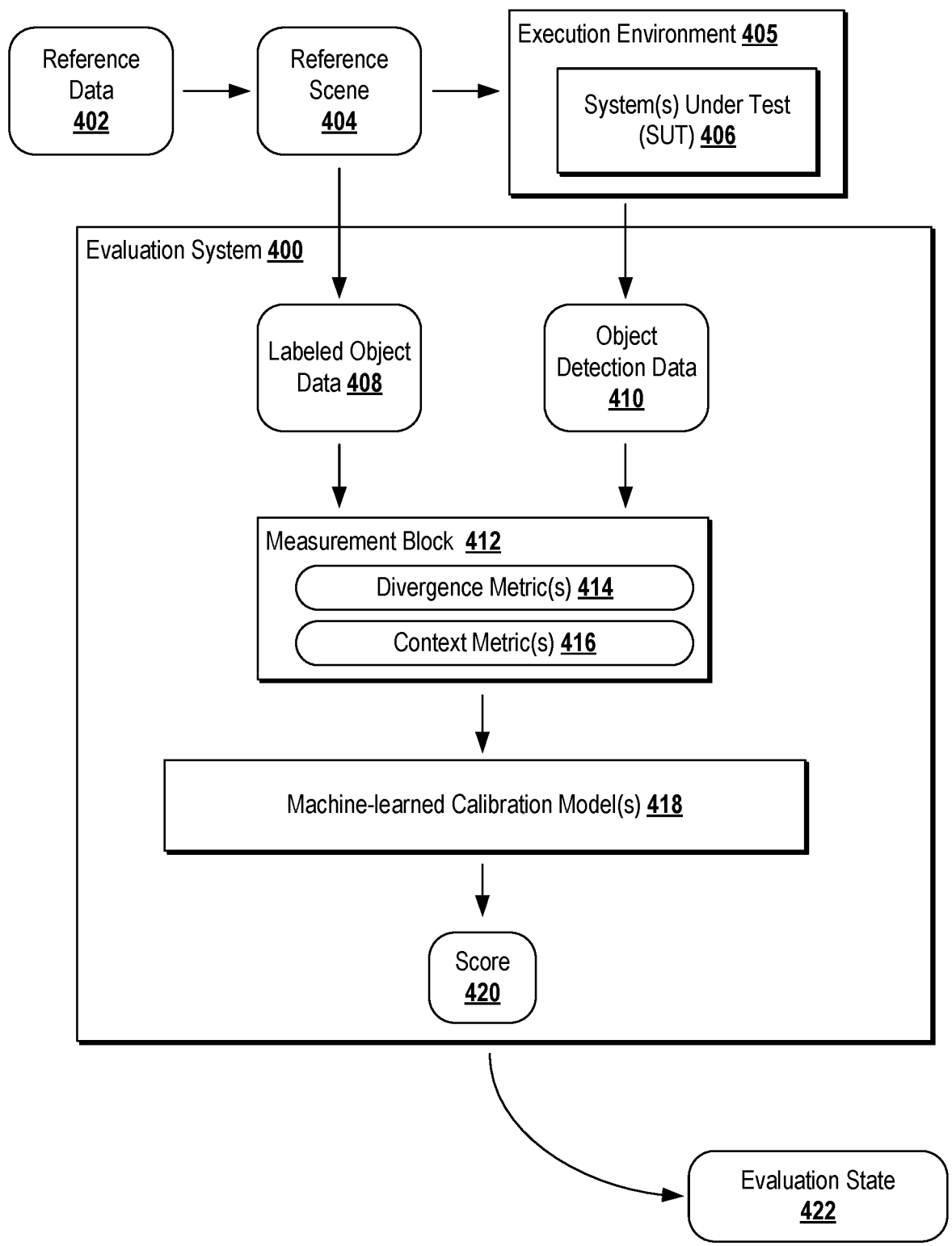
FIG. 4 is a block diagram of an example evaluation system, according to some implementations of the present disclosure.

FIG. 4 is a block diagram of an evaluation system 400, according to some implementations of the present disclosure. Although FIG. 4 illustrates an example implementation of an evaluation system 400 having and interacting with various components, it is to be understood that the components can be rearranged, combined, omitted, etc. within the scope of and consistent with the present disclosure.

Reference data 402 can include data describing a reference scene 404. Reference scene 404 can be a snapshot or recording of sensor data describing an environment. Execution environment 405 can host a system under test (SUT) 406 that is to be evaluated by evaluation system 400. SUT 406 can include a perception system that processes the sensor data of reference scene 404 to generate an understanding of the environment described thereby.

Evaluation system 400 can obtain labeled object data 408 that identifies objects described by reference scene 404. Evaluation system 400 can obtain object detection data 410 generated using SUT 406. Evaluation system 400 can compare labeled object data 408 and object detection data 410 using measurement block 412. Measurement block 412 can generate divergence metrics 414 that represent differences between labeled object data 408 and object detection data 410. Additionally, measurement block 412 can evaluate one or more context metrics 416 that provide additional information regarding the context in which the measured differences of divergence metrics 414 arise. Measurement block 412 can output those measured differences and the context for those differences to machine-learned calibration model(s) 418.

Machine-learned calibration model 418 can process the measurements and contexts from measurement block 412 and generate a score 420 that can characterize whether object detection data 410 are materially different from labeled object data 408. For example, machine-learned calibration model 418 can process divergence metrics 414 and SUT contexts 416 and evaluate whether the detected differences amount to an overall material difference. For example, machine-learned calibration model 418 can determine the influence of divergence metrics 414 on the resulting score 420. In this manner, for instance, machine-learned calibration model 418 can calibrate the influence of the differences between labeled object data 408 and object detection data 410.

Evaluation system 400 can output an evaluation state 422 for SUT 406 based on score 420. For instance, evaluation system 400 can output a positive evaluation state if score 420 is below a threshold (e.g., if object detection data 410 are not materially different from labeled object data 408).

Reference data 402 can include recorded instances of real-world or simulated driving. The recorded data can include data collected by sensors onboard one or more vehicles (e.g., autonomous vehicles, non-autonomous vehicles, etc.). The recorded data can include data collected from other sources (e.g., roadside cameras, aerial vehicles, etc.). Reference data 402 from simulated scenarios can include probabilistic data, such as data sampled from a distribution fitted to a number of observations.

Reference data 402 can include trajectory data. For example, reference data 402 can include recorded trajectories of an actor and data describing the environment in which the actor moves (e.g., map data, perception data). Reference data 402 can include real or synthetic trajectories. Real trajectories can include trajectories traversed by a vehicle in a real-world environment (e.g., by a human-driven vehicle, an autonomous vehicle). Synthetic trajectories can include trajectories traversed by a simulated vehicle in a simulated environment (e.g., a simulation implementing an autonomous vehicle control system to control a simulated vehicle). Synthetic trajectories can include trajectories drawn or otherwise annotated using a review system (e.g., by a human annotator, an automated annotator) to indicate a trajectory that a vehicle should travel in a given situation.

Trajectory data can be used to generate synthetic perception data by simulating outputs of sensors simulated to be moving through a simulated environment along a given trajectory. For instance, a raycasting origin location can be moved through a simulated environment over time in alignment with a trajectory from trajectory data. In this manner, for instance, synthetic sensor data can be generated from recorded trajectories.

Reference data 402 can include logged sensor data or otherwise recorded sensor data. Sensor data can be logged during real-world or simulated driving. Sensor data can be logged by sensors on vehicles or sensors not on vehicles. Sensor data can be obtained from sensors used on autonomous devices or systems or non-autonomous devices or systems.

Reference data 402 can include various kinds of data. Reference data 402 can include real or simulated LIDAR data, RADAR data, image data, audio data, position data, velocity data, acceleration data, orientation data, or any other data captured by or otherwise obtained using sensors that can record information describing a surrounding environment or a system's interaction with the environment.

Reference scene 404 can include a portion of reference data 402 that describes a scene or portion of an environment that is of interest. Reference scene 404 can be characterized as a segment of a larger driving sequence. For example, reference data 402 can include data describing a certain number of seconds or minutes of a larger driving log.

Reference scene 404 can include data that focuses on a particular scene in which a particular object was recorded by one or more sensors. Reference scene 404 can include a subset of or all of the data types from reference data 402 describing an environment, including objects, actors, infrastructure features, etc.

Evaluation system 400 can select reference scene 404 for evaluating SUT 406 based on one or more attributes of reference scene 404. For example, reference scene 404 can describe a particular situation of interest. Evaluation system 400 can evaluate the performance of an autonomous vehicle system (e.g., perception system) in that particular situation of interest by deploying the autonomous vehicle system as SUT 406. For example, reference scene 404 can correspond to a standardized test scenario established by regulation (e.g., regulations promulgated by one or more government agencies). For example, reference scene 404 can include a particular object in a particular environment viewed from a standard perspective. For example, a standard test scene can be configured to test object detection under high occlusion or other challenging conditions.

Evaluation system 400 can select reference scene 404 from a benchmark set of tests maintained by evaluation system 400. For example, evaluation system 400 can maintain a benchmark set that identifies reference scenes 404 (or labeled objects 408) that explore edge cases of detection under different conditions. The benchmark set can be configured to provide examples that help define a boundary of SUT behavior. If a version of an SUT fails one or more of the benchmark tests, it may be determined that the SUT did not achieve or had regressed in performance from a desired level.

For example, the benchmark set can include a first reference scene in which an object is in a position that has a high tolerance for error (e.g., a position far removed from a roadway with minimal chance of intercept) and a second reference scene in which the object is in a different position that has a lower tolerance for error (e.g., nearer to the roadway). While it may be difficult to precisely identify the exact position at which a certain amount of detection error does not materially affect the quality of the perception of the object, evaluating the SUT against both the first and second reference scenes can provide an initial indication that the SUT can make the correct or expected decisions in each of the reference scenes. In this manner, for instance, evaluating SUT 406 against a benchmark set that contains examples that constrain decision boundaries can help identify whether SUT 406 adheres to the desired decision boundaries. As more and more reference scenes are added to the benchmark set, the decision boundaries of SUT 406 can be tested with increasing precision. If SUT 406 can achieve satisfactory performance over the benchmark set, evaluation system 400 can determine that SUT 406 has demonstrated at least a benchmark level of performance in a baseline range of situations and is likely to resolve novel situations consistent with the boundaries constrained by the benchmark set.

Execution environment 405 may be a real or simulated environment. For example, if SUT 406 include a perception system that is configured to receive sensor data inputs and generate perception data outputs (e.g., tracked object data), an operating platform can include a real or virtual machine with one or more real or virtual processors, memory, storage, etc. that enable execution of one or more operations of the perception system. Execution environment 405 can facilitate operation or simulation of sensor devices as well for end-to-end evaluation of SUT 406.

System under test (SUT) 406 can be or include one or more operational systems of an autonomous vehicle. For instance, SUT 406 can include one or more autonomy systems or one or more systems operating in support of an autonomy system. For instance, SUT 406 can include one or more portions of autonomy system 200, such as a localization subsystem 230, a perception subsystem 240, a planning subsystem 250, a control subsystem 260, etc. In some examples, SUT 406 can include real or simulated sensor(s) 202, communication interface(s) 206, remote assistance system 270, platform control devices 212, etc. SUT 406 can include one or more machine-learned models.

Labeled object data 408 can include ground truth object detection data. For instance, a labeled object can include data describing an object (e.g., LIDAR points associated with an object, image data depicting an object, RADAR data, etc.) paired with a label identifying the object (e.g., a bounding box, a centroid marker, an image segment, etc.). In general, labeled object data 408 can be any data registering a semantically meaningful object identity with a portion of sensor data. Labeled object data 408 can include spatial labels (e.g., bounding boxes, points, markers, etc.), temporal labels (e.g., keyframes, interval endpoints, etc. associated with an object appearance), semantic labels (e.g., an object type, object description, etc.), motion labels (e.g., heading, velocity, acceleration, etc.), etc.

Labeled object data 408 can be manually or automatically generated, or some combination thereof. For instance, an image recognition system can process images to automatically generate labels. Those labels can be reviewed manually. The automatically generated labels or the manually confirmed labels can be stored in association with the images to provide a ground truth example of a set of inputs (e.g., the sensor data) and the desired label. Labeled object data 408 can include 2D or 3D bounding boxes. A bounding box can be drawn over sequences of sensor data captures in time to obtain an additional dimension.

Labeled object data 408 can be filtered or otherwise restricted to information that is knowable to the SUT 406 at test time. For instance, review of all sensor data in an offline setting can enable fully or partially occluded objects to be fully recognized, labeled, and characterized. However, at test time, SUT 406 may only have limited visibility of the object. For instance, a vehicle pulling a trailer might be positioned such that SUT 406 does not have visibility of the trailer. In this situation, a label that indicates the position and orientation of the trailer may not be helpful for evaluating SUT 406. For example, it may not be helpful to penalize SUT 406 for not knowing unknowable information.

Object detection data 410 can describe outputs describing objects detected by SUT 406 based on processing reference scene 404. Object detection data 410 can include, for instance, bounding boxes or other recognition markers or outputs generated by SUT 406 around objects detected in reference scene 404. In general, object detection data 410 can be any data registering a semantically meaningful object identity with a portion of sensor data. Object detection data 410 can include spatial labels (e.g., bounding boxes, points, markers, etc.), temporal labels (e.g., keyframes, interval endpoints, etc. associated with an object appearance), semantic labels (e.g., an object type, object description, etc.), motion labels (e.g., heading, velocity, acceleration, etc.), etc.

Measurement block 412 can include logic executed by evaluation system 400 to extract salient features of labeled object data 408 and object detection data 410. Measurement block 412 can include one or more machine-learned models or components. For example, measurements by measurement block 412 can be directly extracted from labeled object data 408 or object detection data 410, can be inferred therefrom using a machine-learned model, or can be obtained using one or more transformations applied to labeled object data 408 or object detection data 410.

In general, measurement block 412 can generate values that represent aspects in which object detection data 410 diverge from labeled object data 408. Divergence can be represented by differences between labeled object data 408 and object detection data 410. Differences can include differences between predicted and actual spatial labels, predicted and actual temporal labels, predicted and actual semantic labels, etc.

Measurement block 412 can estimate or approximate divergences using a collection of divergence metrics that can be aggregated to obtain an overall measure of divergence.

Divergence metrics 414 can include functions, operators, or other components that are configured to compute divergence values that characterize differences between labeled object data 408 and object detection data 410. Divergence metrics 414 can compute differences between labeled object data 408 and object detection data 410. For instance, divergence metrics 414 can compute a difference in a bounding box predicted by SUT 406 and a bounding box associated with labeled object data 408. For example, a divergence metric can compute box intersection over union (IoU) (e.g., 2D or 3D). The IoU can be computed in various different planes. For instance, the boxes can be projected into an image plane as viewed from the perspective of the ego vehicle associated with SUT 406. A divergence metric can compute a difference between how close the nearest point of each box is to a reference point (e.g., a point on a vehicle associated with the SUT, such as an autonomous vehicle operating, in reality or in simulation, the SUT). A divergence metric can compute differences in position or orientation. A divergence metric can compute differences in a rate of change of position or orientation (e.g., velocity, acceleration, jerk, etc.). A divergence metric can compute a difference in volume of a portion of space occupied by sensor data associated with a given object.

A divergence metric can compute differences at one or more points in time. For instance, a test time can be associated with the capture time of the sensor data. Small errors at test time can lead to increasingly large errors over time. For instance, a small divergence in heading at capture time could lead to larger divergences at later times. To evaluate these later-time divergences, evaluation system 400 can compare a forecast of an object position against a labeled object position at a later time. For instance, SUT 406 or evaluation system 400 can generate a forecasted object position at the later time based on the detected object position indicated in object detection data 410. To provide a reference, SUT 406 or evaluation system 400 can generate a forecasted object position at the later time based on the labeled object position indicated in labeled object data 408. To provide a reference, evaluation system 400 can retrieve a labeled object position associated with the later time. For example, the divergence metrics can be compared at capture time and 500 ms in the future, 1 s in the future, 2 s in the future, 5 s in the future, etc.

Divergence metrics 414 can evaluate differences in latent or implicit attributes. Divergence metrics 414 can compute projected or embedded features that implicitly encode meaningful information regarding the scene. Divergence metrics 414 can include one or more machine-learned components. For example, a divergence encoder can be configured to generate a respective divergence value by processing, using one or more machine-learned parameters, at least a portion of reference scene 404, labeled object data 408, detected object data 410, etc. The divergence encoder can be trained end-to-end within evaluation system 400 to generate divergence values that correspond to meaningful differences.

SUT context metrics 416 can include or be based on data describing pertinent characteristics of object detection data 410 with respect to reference scene 404. For example, context metrics 416 can correspond to a relative importance of a particular divergence metric 414. For example, a divergence metric can compute a difference in orientation of a bounding box. This difference might be immaterial, however, if the bounding box is for a parked vehicle on the shoulder of a roadway. Thus, an example SUT context metric 416 can determine the lane position of the object. Such a value can contextualize the generated divergence value (e.g., scale, weight, deprioritize, etc.).

Context metrics 416 can be generated by hand-tuned or engineered components. Engineered components can implement inductive or deductive operations. For instance, an engineered logic or rule can be deduced a priori from laws of physics, kinematics, known constraints, etc. For example, lane position can be an engineered context because it is derived from an a priori understanding of preferences and expectations for road users (e.g., that shouldered vehicles behave differently than vehicles in a travel lane).

Context metrics 416 can be generated by machine-learned components. Machine-learned components can perform inference over inputs to generate outputs. For instance, machine-learned components can infer, based on patterns seen across many training examples, that a particular input maps to a particular output. For example, a context value that contextualizes a particular comparison value can be generated by a machine-learned model. The model can be trained to contextualize comparison values in a manner that improves an evaluation capability of evaluation system 400 (e.g., decreases false positives, decreases false negatives, etc.).

Context metrics 416 can be continuous, piecewise continuous, or discretized. For example, context metrics 416 can define bins of contextual features that adjust importance for divergence metrics 414 when the bin is satisfied. For instance, a context metric can include a weather status (e.g., raining, not raining, etc.). Certain divergence metrics can be more impactful if inclement weather impedes visibility, decreases road surface friction, etc. Based on the presence of rain or no rain, a different context value can be obtained that can modify (e.g., weight, scale, etc.) a divergence value.

Measurement block 412 can generate values that are strictly non-increasing in "goodness" or desirability. Measurement block 412 can generate values that are strictly non-decreasing in divergence. For example, values of divergence metrics 414, context metrics 416, or both (e.g., the products thereof) can be determined such that as the magnitude of the values of divergence metrics 414, context metrics 416, or both (e.g., the products thereof) increase, the agreement or match between labeled object data 408 and object detection data 410 can be strictly non-increasing. This constraint can facilitate efficient construction of decision boundaries for individual parameters. For instance, under such a constraint, it can be noted that an increase in one metric orthogonally to all others (e.g., "all else being equal") will decrease alignment between labeled object data 408 and object detection data 410. This can increase the interpretability of evaluation system 400.

Machine-learned calibration model 418 can reason over the outputs of measurement block 412 to generate a score 420. Machine-learned calibration model 418 can include various different architectures, models, and model components. Machine-learned calibration model 418 can be or include a linear model. Machine-learned calibration model 418 can be or include a nonlinear model.

Machine-learned calibration model 418 can calibrate the influence of the differences between labeled object data 408 and object detection data 410. For example, learnable parameters of machine-learned calibration model 418 can weight the values of divergence metrics 414, context metrics 416, or both (e.g., the products thereof). For example, machine-learned calibration model 418 can generate a learned linear combination of divergence metrics 414, context metrics 416, or both (e.g., the products thereof). For example, machine-learned calibration model 418 can include or generate attention values over divergence metrics 414, context metrics 416, or both (e.g., the products thereof) that indicate how much to attend to respective values of divergence metrics 414, context metrics 416, or both (e.g., the products thereof) when generating an overall score.

Score 420 can represent an overall match or alignment between labeled object data 408 and object detection data 410. Score 420 can quantify how much object detection data 410 diverge from labeled object data 408. Score 420 can be an aggregate score that indicates an aggregate divergence between labeled object data 408 and object detection data 410. Evaluation system 400 can compare score 420 against a threshold to determine whether an amount of divergence is material. For instance, a score below a threshold can correspond to immaterial divergence (e.g., object detection data 410 are effectively as "good" as labeled object data 408, even if they are different in some respects). A score above a threshold can correspond to material divergence (e.g., object detection data 410 are not considered to be as "good" as labeled object data 408 according to a desired validation precision). Evaluation system 400 can output evaluation state 422 based on score 420.

Evaluation state 422 can indicate a determination of quality of the object detection. An evaluation state can be a validation state. A validation state can indicate a positive validation or a lack of validation. A validation state can indicate that SUT 406 at least satisfies a benchmark level of performance.

Evaluation system 400 (e.g., machine-learned calibration model 418) can be trained using a set of labeled matches. Each set of labeled matches can be a unit test. For example, labeled matches can include sets of data that are confirmed to diverge either materially or immaterially. For example, labeled matches can include an object detection and a corresponding label that are confirmed to diverge in a material manner. Labeled matches can include an object detection and a corresponding label that are confirmed to not diverge in a material manner. Training evaluation system 400 can include updating learnable parameters of machine-learned calibration model 418 until evaluation system 400 correctly labels the input labeled matches (e.g., correctly determines that the matches either diverge materially or do not diverge materially). For example, evaluation system 400 can include a type of support vector machine, and labeled matches can provide support vectors that help define a desired decision boundary.

If machine-learned calibration model 418 does not or cannot converge to a set of weights that enables correct labeling of all unit tests, then evaluation system 400 can add additional expressivity to more fully model the task. For example, evaluation system 400 can compute additional divergence metrics. Evaluation system 400 can use additional context metrics (or more nuanced or granular versions of existing metrics). Evaluation system 400 can add additional learnable parameters to machine-learned model 418. Increasing the expressivity of evaluation system 400 can increase a precision with which evaluation system 400 can model a desired decision boundary between detections that "match" or are aligned closely enough to ground truth and detections that do not "match" or are not aligned closely enough.

Figure 5:
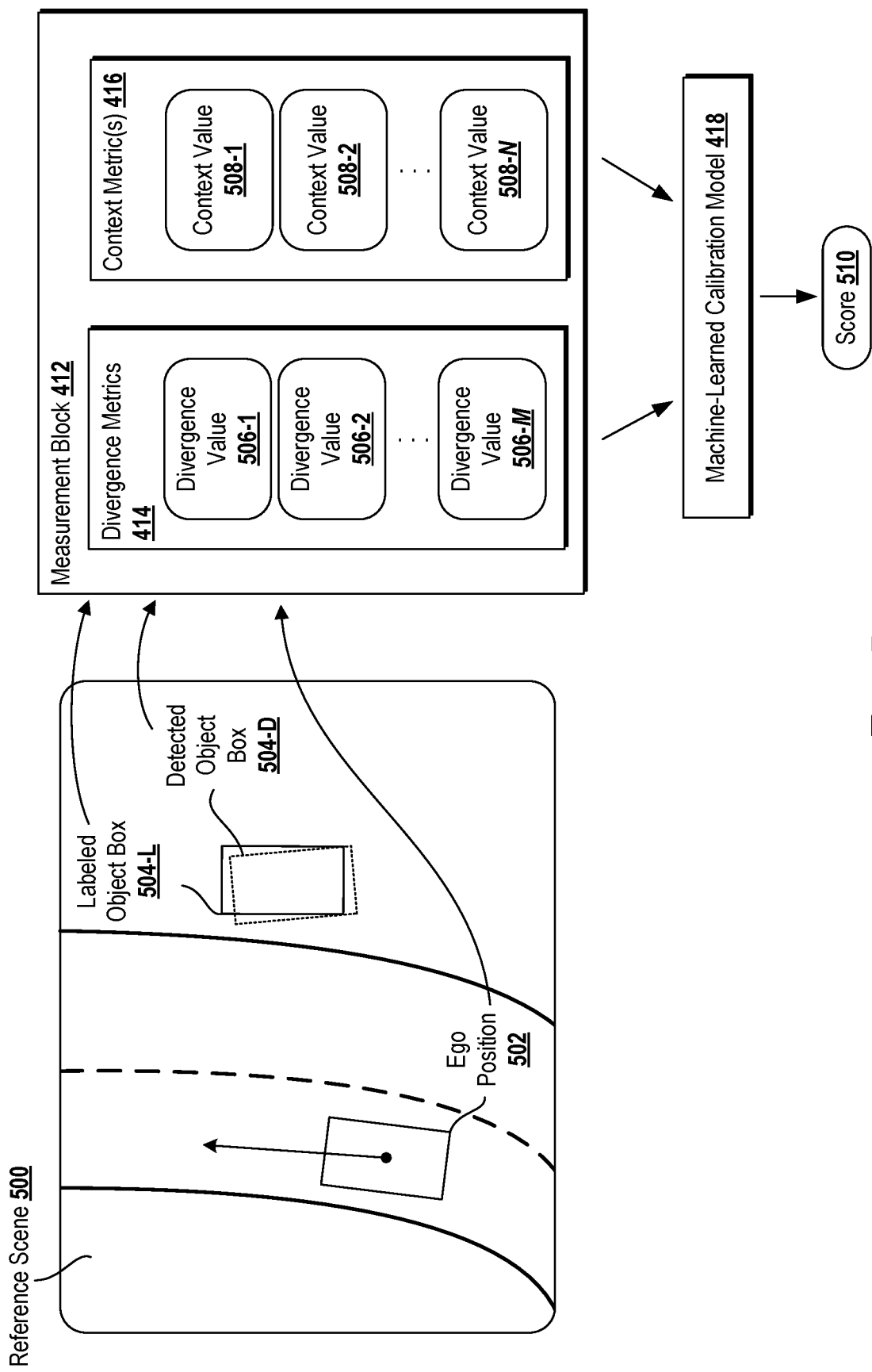
FIG. 5 is a block diagram of a measurement block for an example evaluation system, according to some implementations of the present disclosure.

FIG. 5 is a block diagram of a measurement block 412 according to some implementations of the present disclosure. Measurement block 412 can process a reference scene 500. Reference scene 500 can describe an environment containing an ego vehicle (e.g., an AV or other vehicle) at ego position 502. Reference scene 500 can describe a labeled object position 504-L. SUT 406 can generate a detected object position 504-D based on reference scene 500. Measurement block 412 can process ego position 502, labeled object position 504-L, and detected object position 504-D using divergence metrics 414 and context metrics 416.

For example, divergence metrics 414 can compute a number of divergence values 506-1, 506-2, . . . , 506-M that characterize M differences between labeled object position 504-L and detected object position 504-D. An example divergence metric can compute a divergence value that indicates difference in orientation (e.g., an angular displacement) between labeled object position 504-L and detected object position 504-D.

Context metrics 416 can compute N context values 508-1, 508-2, . . . , 508-N that characterize N attributes of any one or more of ego position 502, labeled object position 504-L, or detected object position 504-D. An example context metric can compute a context value that corresponds to a lane position of the object. For instance, in scene 500, the object is shouldered. Another example context metric can compute a relative distance between labeled object position 504-L and ego position 502. For example, certain errors in detected object position 504-D may be less material when labeled object position 504-L is farther away from ego position 502. Similarly, another example context metric can compute a relative distance between detected object position 504-D and ego position 502. For example, certain errors in detected object position 504-D may be more material when detected object position 504-D closer to ego position 502 (e.g., false positive detections that may induce unnecessary evasive maneuvers).

Another example context metric can compute a measure of how occluded the detected object is from the point of view of the ego vehicle (e.g., a value indicating a proportion of the object that is visible or is not visible). Another example context metric can compute a measure of a distance between the labeled object position 504-L or the detected object position 504-D and a road surface (e.g., how far away from the roadway).

Another example context metric can compute a measure of an estimated time to arrival at a present or forecasted location associated with the object (e.g., a present or forecasted labeled object position 504-L or the detected object position 504-D). For instance, an example context metric can compute a number of seconds until the ego vehicle could be expected to intersect a boundary of the object. The number of seconds can be estimated at a minimum, a lower bound, or under a set of assumed conditions such that the estimated interval is associated with a high probability of being less than the actual value. For instance, the estimated interval can be determined under a set of assumed conditions such that the estimate falls in a low percentile of a distribution of possible intervals (e.g., 1%, 0.1%, 0.01%, etc.).

Another example context metric can indicate a likelihood associated with arrival at a present or forecasted location associated with the object (e.g., a present or forecasted labeled object position 504-L or the detected object position 504-D). For instance, an example context metric can indicate a likelihood associated with a control sequence that would lead to arrival at a present or forecasted location associated with the object. For instance, an example context metric can indicate a likelihood associated with a trajectory that includes an ego vehicle position that overlaps a location associated with the object (e.g., to intersect a boundary of the object).

Machine-learned calibration model 418 can process the divergence values and the context values to generate score 510. Score 510 can indicate an aggregate divergence between labeled object box 504-L and detected object box 504-D.

In FIG. 5, the error between labeled object box 504-L and detected object box 504-D may be determined to be immaterial. For instance, score 510 may not satisfy a threshold that indicates a material aggregate divergence. It may be intuitively understood, for example, that errors in position of a shouldered vehicle may be relatively less important than other perception errors. As such, detected object box 504-D may be sufficiently accurate in that context.

Figure 6:
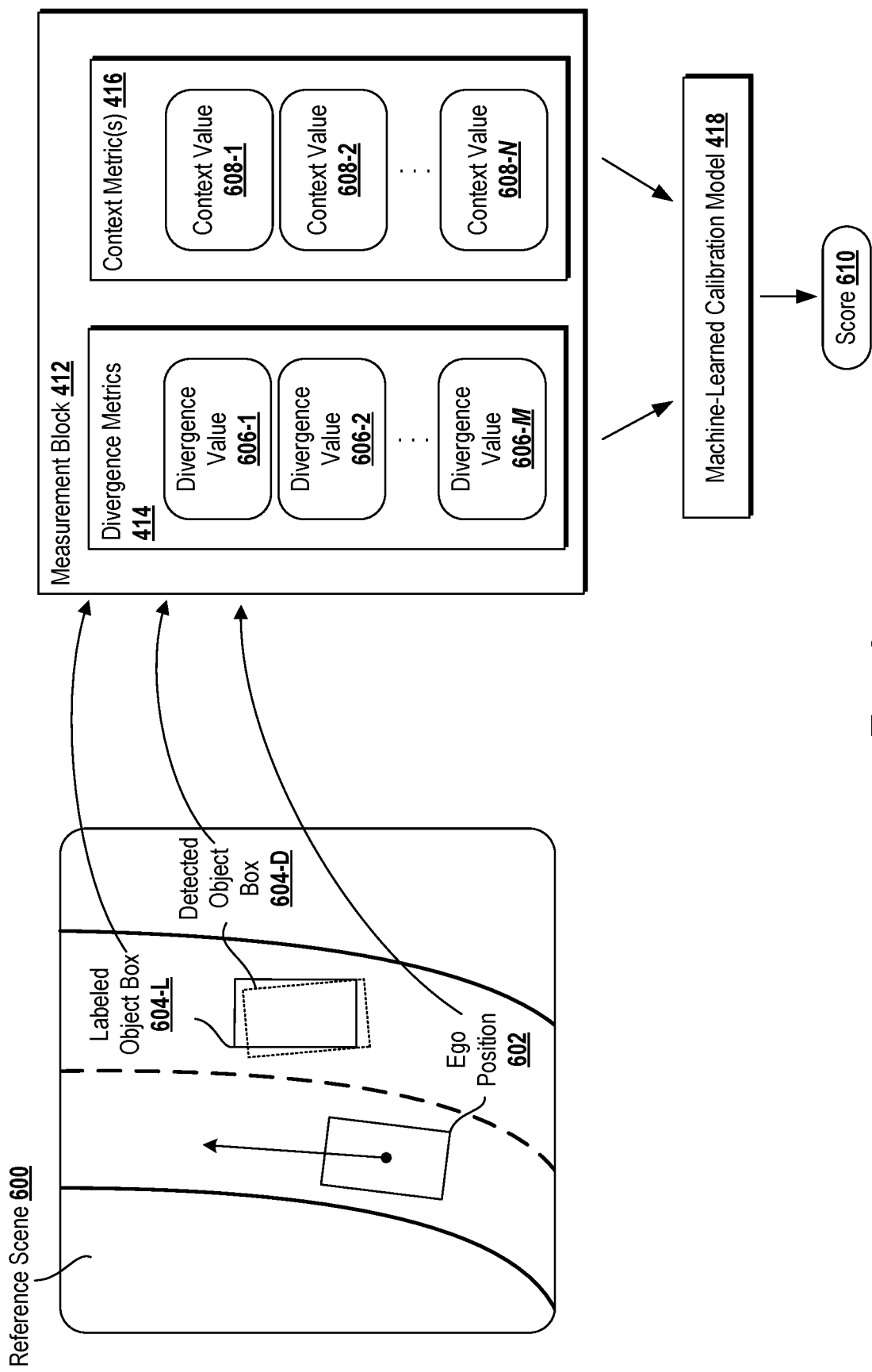
FIG. 6 is a block diagram of a measurement block for an example evaluation system, according to some implementations of the present disclosure.

FIG. 6 illustrates evaluation of a different scene. In FIG. 6, measurement block 412 receives data describing a reference scene 600 that is associated with ego position 602 and labeled object box 604-L (which can be the same as or different from labeled object box 504-L). Measurement block 412 can receive a different detected object box 604-D in response to SUT 406 processing reference scene 600.

Measurement block 412 can process ego position 602, labeled object position 604-L, and detected object position 604-D using divergence metrics 414 and context metrics 416. For example, divergence metrics 414 can compute a number of divergence values 606-1, 606-2, . . . , 606-M that characterize M differences between labeled object position 604-L and detected object position 604-D. Context metrics 416 can compute N context values 608-1, 608-2, . . . , 608-N that characterize N attributes of any one or more of ego position 602, labeled object position 604-L, or detected object position 604-D. Machine-learned calibration model 418 can process the divergence values and the context values to generate score 610. Score 610 can indicate an aggregate divergence between labeled object box 604-L and detected object box 604-D.

In FIG. 6, the error between labeled object box 604-L and detected object box 604-D may be determined to be material. For instance, score 610 can satisfy a threshold that indicates a material aggregate divergence. For example, as compared to the error illustrated in FIG. 5, the error illustrated in FIG. 6 occurs for a vehicle in a lane of traffic (as compared to a shouldered vehicle). In the context of a vehicle in a traffic lane, even the same amount of measured difference (e.g., angular displacement) may be material. Reflecting this increased significance, a context metric associated with lane position can generate a higher context value as compared to reference scene 500, because the prediction relates to a more significant lane position.

Context metrics can compute context values based on one or more inputs. Context metrics can include linear or nonlinear functions of one or more parameters. Context metrics can be continuous, piecewise continuous, or discrete or disjoint. In an example, context values can be piecewise continuous over one or more semantically meaningful subdivisions of a domain of an input space. For example, a quantified expression of significance or importance may be different in different basins of context. For example, a cost associated with angular position error may have a steep slope in an adjacent travel lane (e.g., to cause a high cost of error for vehicles moving directly alongside the ego vehicle). In comparison, a cost associated with angular position error may have a gentler slope for vehicles parked on a shoulder.

Figure 7:
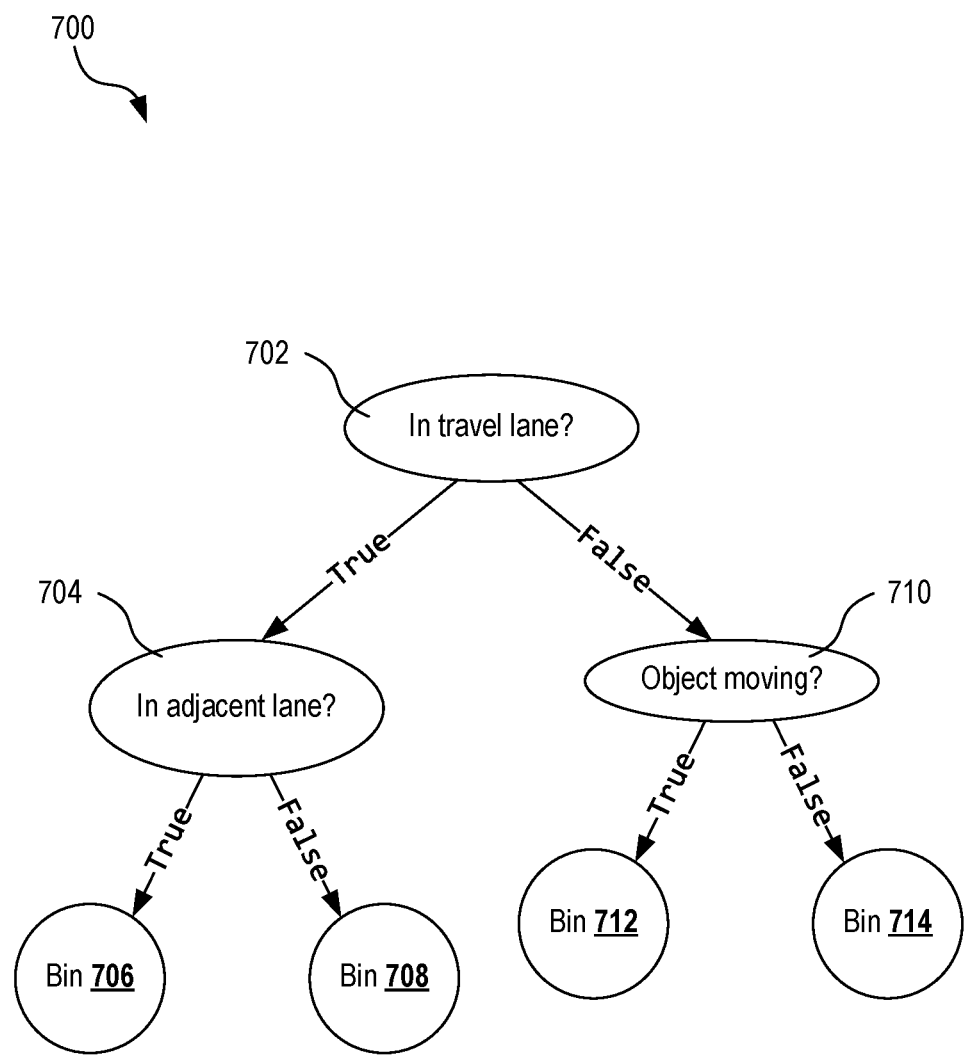
FIG. 7 is an example context tree structure of an example evaluation system, according to some implementations of the present disclosure.

FIG. 7 is an example tree structure 700 that illustrates an approach to binning a domain of an input space for leveraging a piecewise context metric. Example tree structure 700 can divide an input space into two subdivisions based on, at 702, a query about whether the object is positioned in a travel lane. If the response to 702 is True, tree structure 700 can further subdivide the domain at 704 based on whether the object is in a travel lane adjacent to the ego vehicle. If the response to 704 is True, tree structure 700 can associate a given object detection with bin 706. Bin 706 can correspond to a specific context function adapted to situations in which an object is in an adjacent travel lane. If the response to 704 is False, tree structure 700 can associate a given object detection with bin 708. Bin 708 can correspond to a specific context function adapted to situations in which an object is in a travel lane that is not adjacent (e.g., further away from the ego vehicle).

If the response to 702 is False, tree structure 700 can further subdivide the domain at 710 based on whether the object is moving. If the response to 710 is True, tree structure 700 can associate a given object detection with bin 712. Bin 712 can correspond to a specific context function adapted to situations in which an object is moving in a shoulder lane. If the response to 710 is False, tree structure 700 can associate a given object detection with bin 714. Bin 714 can correspond to a specific context function adapted to situations in which an object is parked in a shoulder lane.

Adaptation of context functions in each bin can include learned adaptation. For instance, a context function can have one or more learnable parameters (e.g., a constant weight, a linear slope, coefficients of a nonlinear function, weights in a neural network, etc.). By using tree structure 700 to apply particular functions in certain basins of context, and then by training the context functions based on their performance in their respective contexts, a system can learn specific context functions adapted to particular situations.

Contexts for various scenarios can be binned based on interpretable features that correspond to hand-crafted heuristics. In this manner, for instance, the categorization can facilitate high-confidence confirmation that performance in specific contexts will be prioritized. For instance, whether the object is on a shoulder of a roadway is known to change how significant various divergences can be. By building this world knowledge into the tree structure, the system can be biased to learn prioritizations that align with a priori understandings of significance to a driving task.

Additionally, or alternatively, the features that define the binning can be latent context features learned by a machine-learned model. For instance, machine-learned mixture models or other clustering models can be configured to describe a distribution of contexts or scenarios to identify and cluster groups of contexts that should be evaluated similarly.

Figure 8:
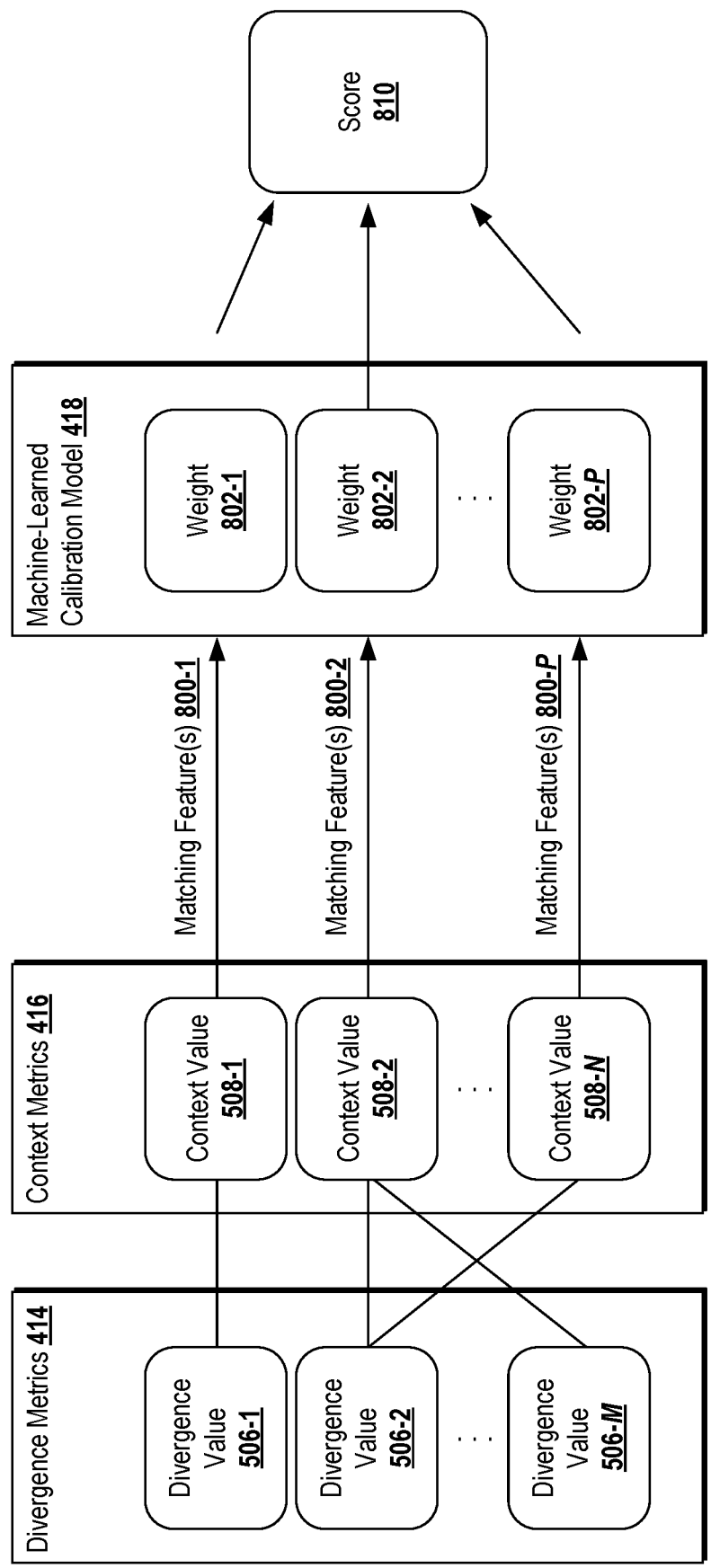
FIG. 8 is a block diagram of a machine-learned model for an example evaluation system, according to some implementations of the present disclosure.

FIG. 8 is a block diagram of an example configuration of a machine-learned calibration model 418 according to example aspects of the present disclosure. Context values 508-1, 508-2, . . . , 508-N can modify one or more of divergence values 506-1, 506-2, . . . , 506-M to obtain P matching features 800-1, 800-2, . . . , 800-P (e.g., 800-1 can be a product of 506-1 and 508-1). The matching features can reflect a coarse or initial estimate of an influence of various divergence values on score 420 based on the context value(s). Machine-learned calibration model 418 can include one or more weights that calibrate the influences of the P matching features 800-1, 800-2, . . . , 800-P. In an example, machine-learned calibration model 418 can include P weights 802-1, 802-2, . . . , 802-P that respectively correspond to the P matching features 800-1, 800-2, . . . , 800-P.

Matching features can be a linear product of a divergence value and a context value. Matching features can be based on the divergence values and the context values in more complex arrangements. For instance, context metrics can map to one or more bins of context states. One approach is to have a different context value for each bin, where the different context values can modify the same divergence metric. Another approach is to generate different divergence metric instances for each bin, such that as contexts for a particular object detection fall into a bin, the corresponding divergence metric is used for computing a divergence. This divergence metric can directly supply a matching feature x that may not be further adjusted by an explicit context value before being processed by machine-learned calibration model 418.

A constraint over the context features can force the context metrics to have a monotonic effect on the resulting matching feature. For instance, the effect of the context can be constrained such that as the context value increases, the matching feature value increases as well gets larger, the match score is weighted more highly. This can be accomplished by using, as the indicator functions, step basis functions. The step basis functions can be activated at the beginning of the domain covered to each bin. Instead of indicator functions that "turn off" when exiting the bin (e.g., generating one-hot vector over a distribution of bins), example step functions can continue to be activated after an initial threshold is satisfied, such that the overall matching feature value grows cumulatively. For example, a resulting indicator vector, rather than having elements of value 0 everywhere with 1 at only one element, instead can contain multiple 1 values after an initial activation (e.g. [0,0,1,1,1] rather than [0,0,1,0,0]). In an example, this can provide a piecewise constant and monotonic function of the context. The magnitudes of the step functions can be determined by corresponding context values (e.g., corresponding to the bins) and thereby weight the divergence values differently in each bin.

A context value itself can be a piecewise linear and monotonic function. For instance, instead of step functions, ramp or other piecewise linear functions can be used in h (y). The ramps can be centered on a sequence of knot points or joints that anchor a particular range over which the context value is to vary. The joints can be positioned using learned transitions or hard-coded.

An efficient computational technique for computing these different metrics uses a tensor product (e.g., a Kronecker product) of a vector of indicator functions h (y) where y is a context value and a vector of divergence values x. Computing the tensor product can include generating a block matrix that contains a number and arrangement of blocks that respectively correspond to a number and arrangement of values in a first matrix (e.g., a 2×2 first matrix leads to a product with 2×2 blocks). In each block, a corresponding value of the first matrix uniformly scales an entire second matrix, such that the block size is the size of the second matrix. This computational structure using a linear classifier can allow for efficient expansion of a feature set.

For example, machine-learned calibration model 418 can generate a linear combination of the P matching features. In an example, let x represent a vector of the matching feature values and w represent a vector of P weights of machine-learned calibration model 418. An example score 810 can be computed as $w^T x$ to indicate an aggregate divergence of the input detections. The vector w can be constrained to not flip a direction of a value in x (e.g., constrained to be positive) so as to not alter the predetermined effect of a divergence metric. This can aid interpretability and increase expressivity of the model, as the model is freed from having to learn the underlying physical, legal, or other causes of increased cost. A match can be determined as $w^T x < \theta$, where $\theta$ is a threshold value for determining a match.

In an example expression, let b=eigen_pwl(x, k) be an operator that receives an input divergence metric value x and a vector of knot points k and returns a basis vector b such that a dot product of the basis vector b with a vector of slopes s provides a piecewise linear function F having the specified slopes.

An example divergence metric $F_{divergence}$ for a measurement m can then be expressed as $$F_{divergence}(m) = \text{eigen\_pwl}(m,k) \cdot s$$

where $F_{divergence}(m)$ is a piecewise linear function in m where when $m \leq k_0$, the slope is $s_0$, when $k_0 < m \leq k_1$, the slope is $s_1$, etc.

Similarly, an example context metric $F_{context}$ for a measurement n can then be expressed as $$F_{context}(n) = \text{eigen\_pwl}(n,v) \cdot z$$

where $F_{context}(n)$ is a piecewise linear function in n where when $n \leq v_0$, the slope is $z_0$, when $v_0 < n \leq v_1$, the slope is $z_1$, etc.

An example matching feature then can be expressed as:

$$F_{matching}(m,n) = F_{divergence}(m) \cdot F_{context}(n) = d \cdot [\text{eigen\_pwl}(n,v) \otimes (\text{eigen\_pwl}(m,k))]$$

where a set of weights d can be factorized as $$d = z \otimes s.$$

For example, z and s can be individually learned and selected based on engineered logic or physical constraints or principles. Alternatively, values of d can be learned directly (e.g., corresponding to weights of machine-learned calibration model 418), subject to various constraints (e.g., constraints on a change of sign to regularize the learned model). For example, the effect of the context and the divergence can be initialized with unit-valued functions, and machine-learned calibration model 418 can calibrate the magnitudes of the slopes to dial in the result. In this manner, for instance, the resulting function $F_{matching}(m, n)$ can be linear in all its parameters (e.g., the slopes) and can be jointly piecewise linear in the inputs (e.g., m and n).

In some scenarios, a highly regularized, constrained model can provide improved performance with high interpretability and low risk of overfitting, thereby enabling strong out-of-domain performance. In some implementations, more complex machine-learned models can be used.

Figure 9:
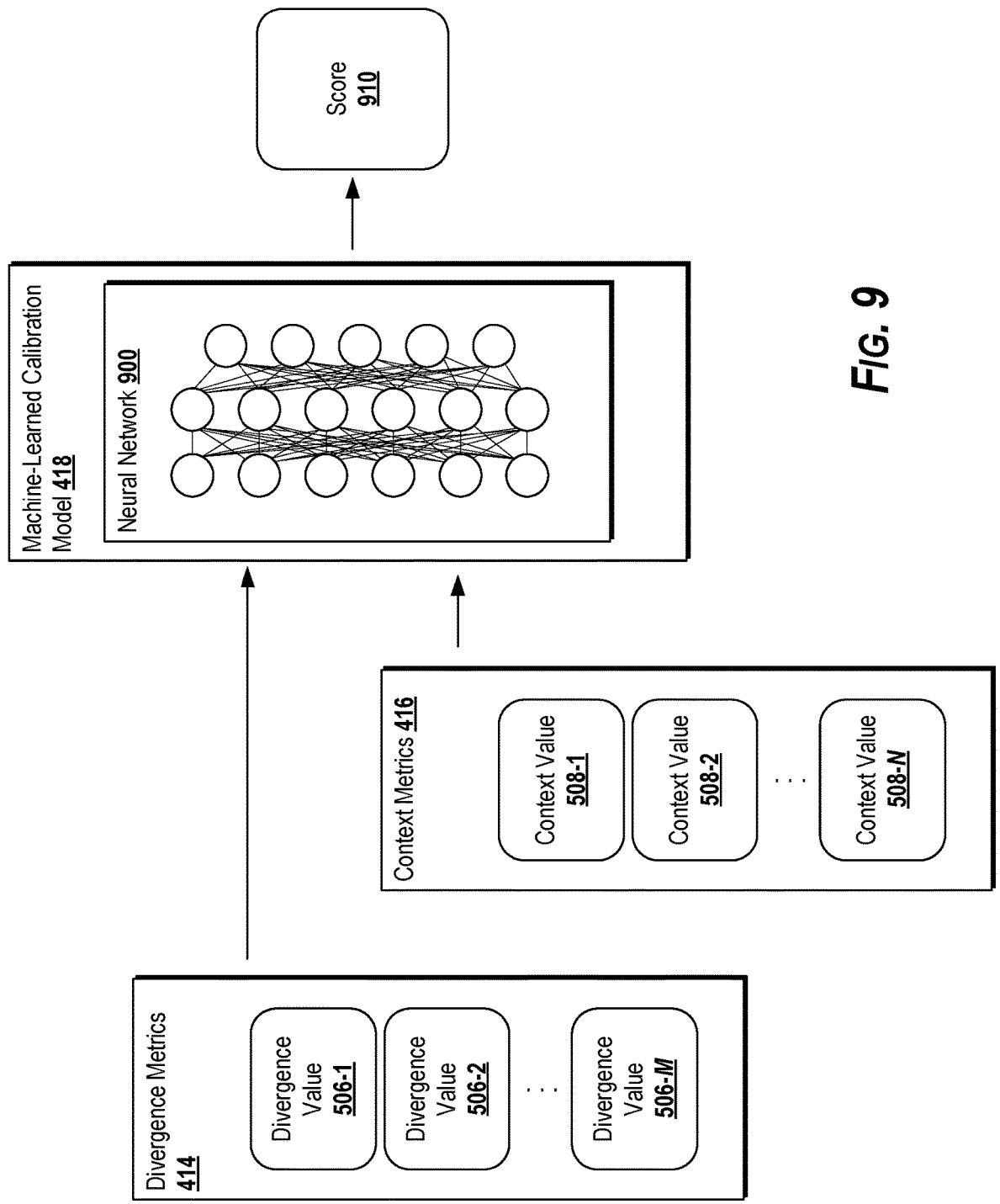
FIG. 9 is a block diagram of a machine-learned model for an example evaluation system, according to some implementations of the present disclosure.

For instance, FIG. 9 is a block diagram illustrating an example implementation in which a neural network 900 can process input data based on divergence metrics 414 and context metrics 416 to generate a score 910. Although a fully connected network is illustrated, various different architectures can be used, such as transformer-based architectures, CNNs, RNN, LSTM, feedforward networks, etc. The network can be linear or nonlinear.

The neural network can include a number of weights that can outnumber the quantity of divergence metrics 414 and context metrics 416. The neural network can be small. The neural network can have only a small number of layers, such as one, two, or three layers, although more layers can be used (e.g., less than 10, less than 20, etc.). A single-layer linear neural network can effectively represent a linear weighted combination as described above.

An input dimension of the neural network can match a quantity of divergence metrics 414. A number of channels of an input layer can include a channel for divergence values and a channel for context values. Divergence values and context values can be concatenated and processed in one channel.

To train machine-learned calibration model 418 (e.g., weights 802-1, 802-2, . . . , 802-P), evaluation system 400 can leverage a number of unit tests. A unit test can include a pair of object detections that are confirmed to not have a material divergence or a pair of object detections that are confirmed to have material divergence. For I positive unit tests (a positive match) and J negative unit tests (no match), learning weights 702-1, 702-2, . . . , 702-P can include optimizing weights 702-1, 702-2, . . . , 702-P such that $$\max_{i \in \{1,\ldots,I\}} [w^T x^i] < \min_{j \in \{1,\ldots,J\}} [w^T x^j]$$

where $x^i$ represents the set of matching features for the i-th member of the set of I positive unit tests and where $x^j$ represents the set of matching features for the j-th member of the set of J negative unit tests. In other words, for an example optimization, all the computed scores for all the positive unit tests should be less than all the computed scores for all the negative unit tests, since all the negative unit tests by definition have more material divergences. The system can learn weights 702-1, 702-2, . . . , 702-P with additional objectives, such as finding the smallest set of such weights that satisfy the above criterion.

The output can be reshaped using various scaling and transformations to obtain a score mapped to a desired range (e.g., [0, 1]) having a desired threshold. For example, the output can be rescaled using $$\frac{1}{1 + e^{w^T x - \theta}}.$$

Figure 10:
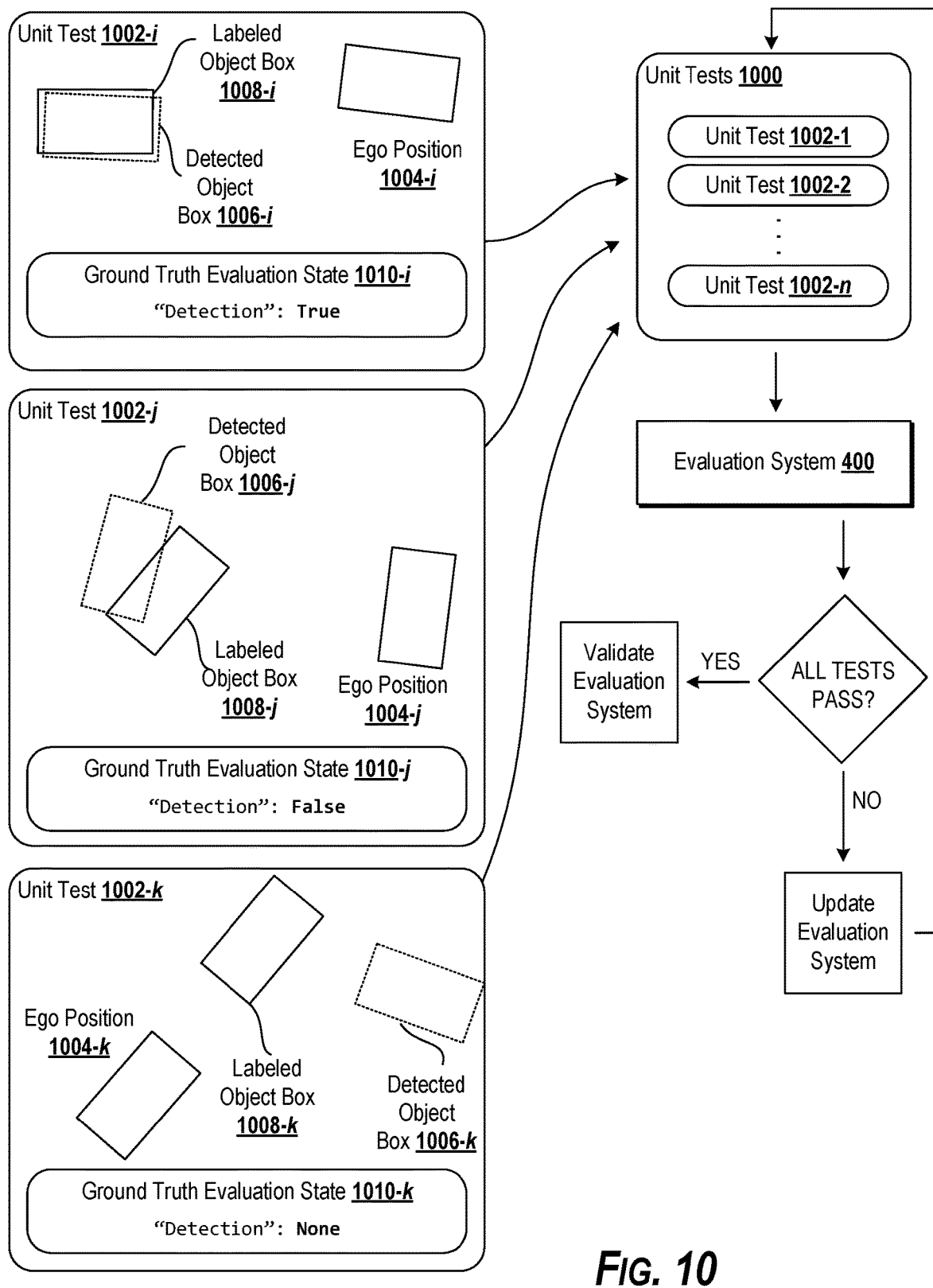
FIG. 10 is a block diagram of a system for training an example evaluation system, according to some implementations of the present disclosure.

FIG. 10 is a flow chart of a process for updating evaluation system 400 using a set of unit tests 1000, according to some aspects of the present disclosure. Unit tests 1000 can include one or more unit tests 1002-1, 1002-2, . . . , 1002-n.

An example unit test 1002-i can include a recorded ego vehicle position 1004-i, a detected object box 1006-i, and a labeled object box 1008-i. Unit test 1002-i can be associated with a ground truth evaluation state 1010-i that records a validation or evaluation state of the match between detected object box 1006-i and labeled object box 1008-i. For instance, unit test 1002-i can be associated with a value "Detection": True that indicates that detected object box 1006-i is valid and matches labeled object box 1008-i.

An example unit test 1002-j can include a recorded ego vehicle position 1004-j, a detected object box 1006-j, and a labeled object box 1008-j. Unit test 1002-j can be associated with a ground truth evaluation state 1010-j that records a validation or evaluation state of the match between detected object box 1006-j and labeled object box 1008-j. For instance, unit test 1002-j can be associated with a value "Detection": False that indicates that detected object box 1006-j is a valid detection but does not sufficiently match the labeled object box 1008-j.

An example unit test 1002-k can include a recorded ego vehicle position 1004-k, a detected object box 1006-k, and a labeled object box 1008-k. Unit test 1002-k can be associated with a ground truth evaluation state 1010-k that records a validation or evaluation state of the match between detected object box 1006-k and labeled object box 1008-k. For instance, unit test 1002-k can be associated with a value "Detection": None that indicates that detected object box 1006-k is not a valid detection with respect to labeled object box 1008-k (e.g., the error is so great as to be spurious).

Evaluation system 400 can process one or more unit tests to determine whether evaluation system 400 correctly identifies the detection state. For instance, evaluation system 400 can include one or more adjustable thresholds. A first threshold can be set such that scores above the threshold correspond to "Detection": True. The first threshold can be set such that scores below the threshold correspond to "Detection": False. A second threshold can be set such that scores below the threshold correspond to "Detection": None.

Evaluation system 400 can process all unit tests 1000. A system can update/optimize (iteratively/numerically or analytically) parameters of evaluation system 400 (e.g., weights, thresholds, etc.) such that all unit tests pass. Passing a unit test can include generating an evaluation state that aligns with the stored evaluation state associated with the unit test. For instance, each unit test can represent a confirmed judgment (e.g., a human judgment) that a given object detection matches a label, does not match a label, or is spurious. Evaluation system 400 can pass a unit test if it correctly identifies the evaluation state for the unit test. If one or more unit tests fail, then the behavior of evaluation system 400 may be deviating from expectations.

In some situations, a failed unit test indicates a suboptimal selection of learnable parameters of evaluation system 400, and further training can produce a set of parameters that cause evaluation system 400 to pass all unit tests. In some cases, however, the expressive power of evaluation system 400 is too constrained to satisfy all unit tests. In such cases, for example, additional terms, degrees of freedom, parameters, etc. can be added to evaluation system 400 to enable evaluation system 400 to fully model all unit tests.

In a simplified example, for instance, if a unit test required that evaluation system 400 severely penalize any error in detections of red objects—and evaluation system 400 did not have any context metric associated with object color—then there may be no set of optimal parameters which would cause evaluation system 400 to pass all unit tests, so long as evaluation system 400 is unable to recognize object color and penalize errors accordingly. Resolving the impasse can include adding a context metric that weights one or more errors based on a detected object color. In this manner, for instance, if evaluation system 400 is unable to satisfy all unit tests, then additional features can be added (e.g., additional divergence metrics, additional context metrics) to increase an expressive power of evaluation system 400.

In an example, using three levels of values of Detection can enable evaluation system 400 to both evaluate a quality of object detections and prune spurious detections using a single framework (e.g., using the score(s) computed using divergence metrics 414 and context metrics 416).

For example, a perception system can use an instance of evaluation system 400 to determine whether a new detection input matches an existing object track (or a forecast therefrom). Based on a score output from evaluation system 400, the perception system can assign a new detection to an existing track (with or without errors, which can be handled separately) or can discard the new detection as spurious. If a detection is assigned to a track with errors (e.g., "Detection": False), then the perception system can initiate recovery methods to improve the alignment of the detection with the track, either by updating the object track to reflect the new world state as recorded in the new detection or by cross-checking and confirming the new detection with additional/backup sensors or other processing algorithms (e.g., different filters, etc.).

In this manner, for instance, evaluation system 400 can be used online or offline. For instance, evaluation system 400 can be used online to evaluate a quality of a new detection of a perception system. Evaluation system 400 can be used offline to evaluate a benchmark performance of a new perception system over a set of benchmark scenes to evaluate the new perception system for performance advancement, regression, or minimum performance baselines.

Figure 11:
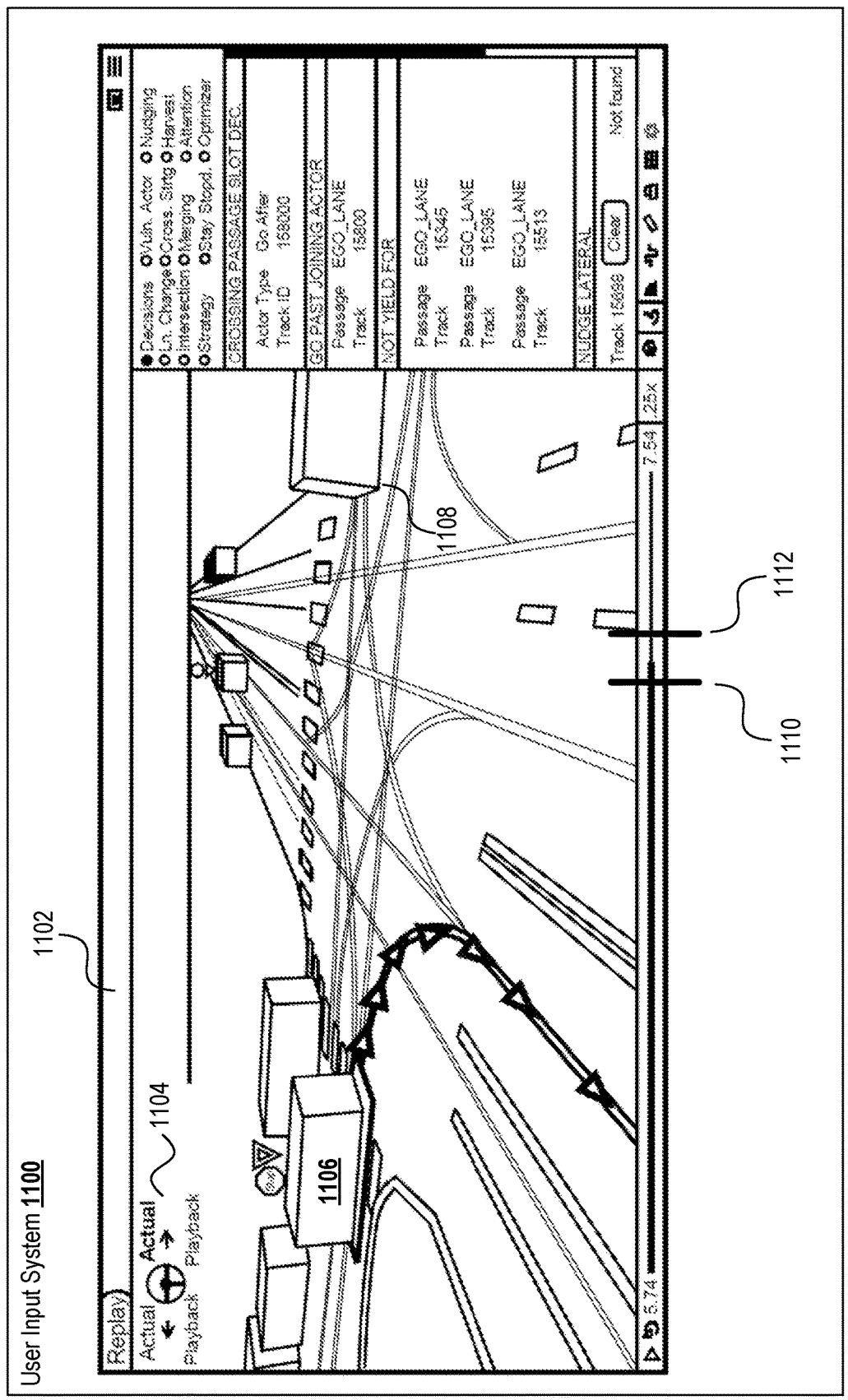
FIG. 11 is an example user interface for an example evaluation system, according to some implementations of the present disclosure.

FIG. 11 is an illustration of an example interface of a user input system 1100 that human operators can use to input labeled object data 408 (e.g., object bounding boxes, anchors, etc.). An interface 1102 can present a rendering of log data that can be "replayed"—that is, log data at various time steps can be presented in sequence (e.g., controlled by playback controls 1104) to facilitate review of scenes of an environment.

A user can interact with the interface 1102 to draw a labeled box, such as a box 1108 around an object. Drawing a box can include tracing a path across an input surface (e.g., touch-sensitive input surface, using a cursor, etc.). Drawing a box can include selecting coordinates at which to anchor vertices of the box. A user can interact with interface 1102 to designate time intervals within which the annotations are valid. For example, interface 1102 can receive inputs that associate points on a timeline with beginning and ending times of a time interval (e.g., inputs selecting positions 1110 and 1112 on a timeline element).

User input system 1100 can facilitate review of pairs of labeled boxes and detected boxes for labeling the pairs as positive matches or negative matches. For example, interface 1102 can render two boxes: one labeled box and one box generated by SUT 406. Interface 1102 can display an input element that, when selected, causes user input system 1100 to store a label indicating that the boxes do not materially diverge. Interface 1102 can display an input element that, when selected, causes user input system 1100 to store a label indicating that the boxes do materially diverge.

User input system 1100 can facilitate review of object detection data 410 in different reference scenarios. For example, user input system 1100 can cause input interface 1102 to display object detection data 410 (e.g., boxes) that are ranked or filtered according to one or more criteria. For instance, a value of an individual divergence metric or context metric can be used for ranking or filtering. For example, user input system 1100 can receive an input requesting a listing of object detection data 410 (e.g., boxes) that have the highest divergence value in a particular metric (e.g., position, forecasted position, etc.). In this manner, for instance, the structure of the evaluation system 400 itself into interpretable divergence metrics can facilitate more granular interrogation of how SUT 406 is diverging to reveal potential underlying causes of such divergences.

Figure 12:
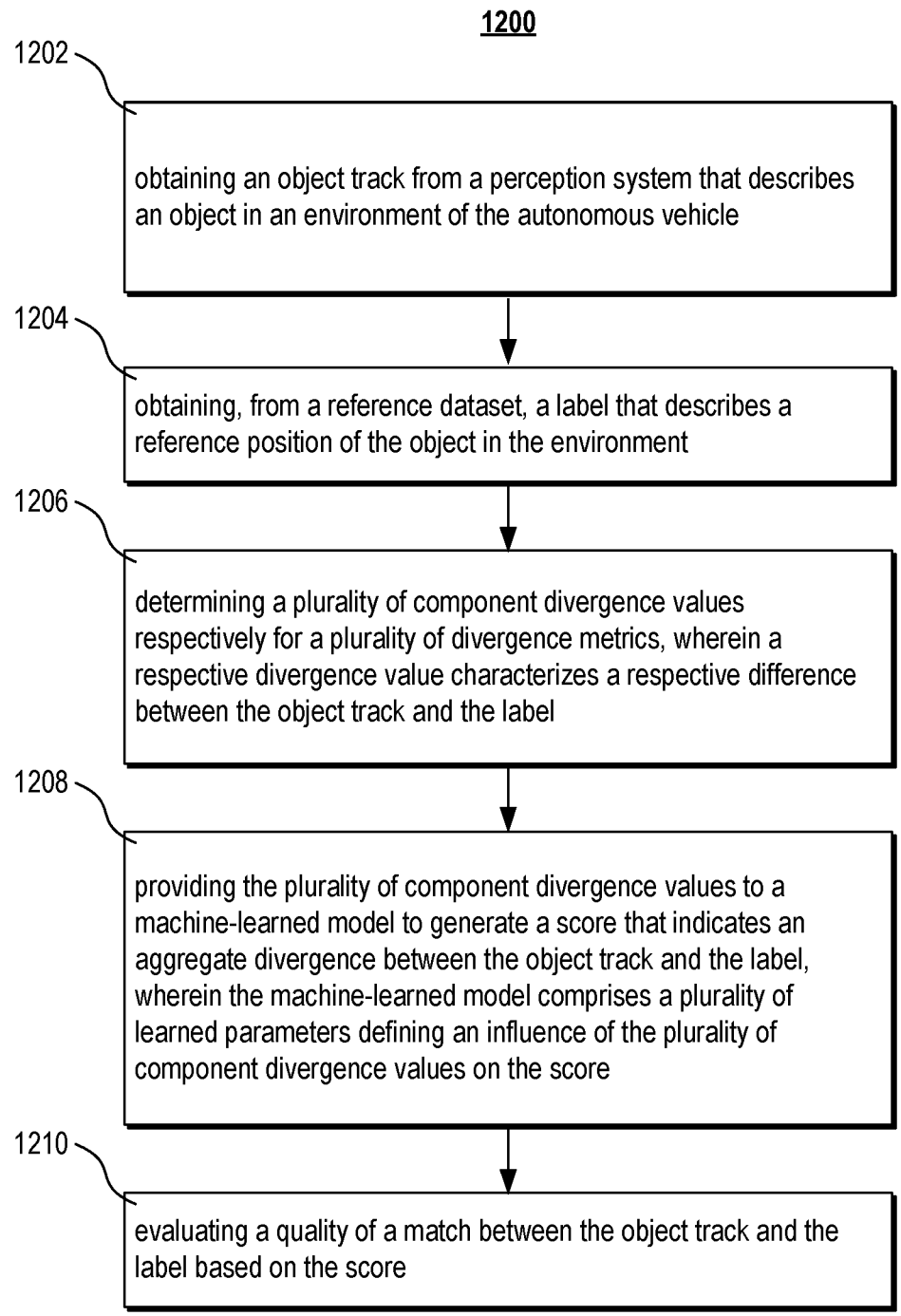
FIG. 12 is a flowchart of an example method for validating a motion planner, according to some implementations of the present disclosure.

FIG. 12 is a flowchart of a method 1200 for evaluating a system under test (e.g., a perception system) according to aspects of the present disclosure. One or more portions of example method 1200 can be implemented by the computing systems described with reference to the other figures (e.g., autonomous platform 112, vehicle computing system 180, remote system 160, a system of FIGS. 1 to 15, etc.). Each respective portion of example method 1200 can be performed by any (or any combination) of one or more computing devices. Moreover, one or more portions of example method 1200 can be implemented on the hardware components of the devices described herein (e.g., as in FIGS. 1 to 15, etc.).

FIG. 12 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 12 is described with reference to elements/terms described with respect to other systems and figures for exemplary illustrated purposes and is not meant to be limiting. One or more portions of example method 1200 can be performed additionally, or alternatively, by other systems.

At 1202, example method 1200 can include (a) obtaining an object detection from a perception system that describes an object in an environment of the autonomous vehicle. For instance, the object detection can include data describing an object's dimensions, position, orientation, heading, type, etc. The object detection can be part of an object track that collects detection observations over time (e.g., over one or more execution cycles of the perception system) to generate a trace of object behavior over time. In an example, the object detection can include a bounding box predicted for at least a portion of the object.

At 1204, example method 1200 can include (b) obtaining, from a reference dataset, a label that describes a reference position of the object in the environment. For instance, the label can include a ground truth bounding box for the object. For example, a sensor data capture describing the environment can be annotated using an annotation system that generates ground truth annotations of objects in the environment (e.g., using user inputs to record, e.g., bounding boxes around objects). The label can include data that has been determined (e.g., manually, automatically) to indicate one or more attributes of the object in the environment.

At 1206, example method 1200 can include (c) determining a plurality of component divergence values respectively for a plurality of divergence metrics. For example, a divergence metric can compute a divergence value based on one or more input features (e.g., data obtained from the perception system). The input features can include the object detection data, the label data, or other context data obtained from the perception system. In an example, a respective divergence value characterizes a respective difference between the object detection and the label. In some implementations of example method 1200, the plurality of divergence metrics are evaluated between a labeled bounding box and a detected bounding box from the object detection.

At 1208, example method 1200 can include (d) providing the plurality of component divergence values to a machine-learned model to generate a score that indicates an aggregate divergence between the object track and the label. The machine-learned model can include a plurality of learned parameters defining an influence of the plurality of component divergence values on the score. For instance, the aggregate divergence can be an overall measure of the extent to which the object detection is meaningfully different from the label. The machine-learned model can be a machine-learned calibration model 418 that calibrates the relative importance of measured differences between the label and the object detection.

The aggregate divergence can aggregate over the component divergence values as individual signals. The individual signals of the component divergence values can be weighted using the machine-learned model. The weighting can be explicit (e.g., with a weight associated with a particular signal for combining in a weighted sum). In some implementations of example method 1200, the plurality of learned parameters respectively correspond to the plurality of divergence metrics. The weighting can be implicit (e.g., with weights of a neural network operating over multiple inputs to generate an aggregate divergence that reflects a learned prioritization over different signals). In some implementations of example method 1200, the plurality of learned parameters respectively correspond to the plurality of divergence metrics.

In some implementations of example method 1200, the score includes a weighted combination of the plurality of component divergence values, wherein the plurality of learned parameters are used to perform the weighting in the weighted combination.

In some implementations of example method 1200, the weighted combination is a linear combination.

In some implementations of example method 1200, the score is generated using a piecewise function that is linear with respect to each component divergence metric.

In some implementations of example method 1200, the piecewise function includes learnable parameters that are constrained from flipping a direction of a contribution of a component divergence metric to the score.

In some implementations of example method 1200, the score is generated using a piecewise function that is linear with respect to each component divergence metric. In some implementations of example method 1200 the piecewise function includes one or more segment slopes and one or more segment intercepts include learnable parameters that are obtained using the plurality of unit tests. In some implementations of example method 1200, the piecewise function can be expressed using a tensor product of a vector of basis functions of context and a vector of component divergence values.

At 1210, example method 1200 can include (c) evaluating a quality of a match between the object track and the label based on the score. For example, a quality of the match can correspond to whether the generated object detection is close enough to the labeled object data to facilitate adequate operations of downstream components from the perception system (e.g., motion planning systems). A quality measure can have continuous or discrete values.

In some implementations, example method 1200 includes assigning an evaluation state to a component of the perception system based on the score. For instance, an evaluation state can be indicated by a numerical score. An evaluation state can be indicated by a Boolean value (e.g., True, False).

An evaluation state can be indicated by a hierarchy of flags. For instance, a first flag can indicate a good match. A second flag can indicate a bad match. A third flag can indicate a failure to generate any valid match. These flags can be generated based on a comparison of a raw score to one or more thresholds.

In some implementations, the evaluation state is a validation state that indicates that the perception system has achieved a benchmark level of performance.

In some implementations, example method 1200 includes generating, using the machine-learned model, a respective score for a respective object detection of a plurality of object detections generated by the perception system to determine a quality of a match with a respective label corresponding to the respective object track. For example, the plurality of object detections can be generated by processing a set of unit tests.

In some implementations of example method 1200, assigning a validation state to the component of the perception system based on the score includes determining a proportion of matches for the plurality of object detections that satisfy a threshold quality. For instance, across a set of unit tests, a pass rate can be computed by determining a proportion of tests for which the perception system generated object detections that sufficiently aligned with the corresponding labels.

In some implementations of example method 1200, assigning a validation state to the component of the perception system based on the score includes comparing the proportion to a target threshold proportion. The target proportion can be a fraction of the unit tests up to and including an entirety of the unit tests.

In some implementations of example method 1200, assigning a validation state to the component of the perception system based on the score includes assigning the validation state based on the comparison. For instance, based on achieving a target level of performance, a validation state of "Validated" can be assigned to the perception system.

In some implementations, example method 1200 includes, prior to (c), determining the plurality of learned parameters by fitting a linear model to a plurality of unit tests, wherein a respective unit test includes an example object detection and a unit test label indicating reference data for the object. In some implementations of example method 1200, the respective unit test is stored in association with a ground truth designation indicating whether there is a material divergence between the example object track and the unit test label.

For example, instead of using unit tests to validate a performance of the perception system, a set of unit tests with known evaluation states (e.g., an object detection that is known to match a label, known not to match a label, etc.) can be used to evaluate the evaluation system's ability to accurately recognize and determine the evaluation state for a particular unit test.

The evaluation system can be updated to align with the decision boundary reflected in the unit tests. For instance, the set of unit tests can trace a decision boundary around what types of differences matter in different contexts. For instance, one unit test can include a particular divergence between an object detection and a label in a first scene. In this unit test, the aggregate divergence can be material. Another unit test can include the same or a similar divergence in a second, different scene. In this unit test, the divergence can be immaterial. The evaluation system can learn to distinguish between such unit tests.

In some implementations of example method 1200, the object detection and the label are obtained from a unit test associated with a positive match. In some implementations of example method 1200, (e) includes determining that the score indicates a negative match based on a failure of the score to satisfy a threshold. In some implementations of example method 1200, (e) includes updating one or more of the plurality of learned parameters to cause the score to satisfy the threshold.

In some implementations, example method 1200 includes weighting a respective contribution of the respective component divergence value using a context value obtained using a context metric, wherein the context value is based on an attribute of the object. The attribute of the object can be obtained from the object detection. The attribute of the object can be obtained from the label data.

An attribute of the object can include a relationship between the object and the environment. For instance, a relationship between the object and the environment can include a distance from another object in the environment. A relationship between the object and the environment can include a distance from an ego vehicle in the environment (e.g., a vehicle associated with generating the object detection, such as a vehicle operating the perception system). A relationship between the object and the environment can include a lane position.

An attribute of the object can include a type of the object. For example, a type of the object can include an object classification output from an object classifier. Example object types can include vehicles, infrastructure elements, pedestrians, etc.

In some implementations, example method 1200 includes determining, using the context metric and based on an attribute of the object detection or the label, a context domain for the respective component divergence value. In some implementations, example method 1200 includes weighting the respective contribution of the respective component divergence value based on a weighting parameter associated with the context domain. For example, context domains can correspond to ranges of a context parameter. A context metric can be a piecewise function over the ranges of the context parameter. In each range, the context metric can apply a different computation to generate a context value (e.g., a weighting parameter) for weighting a corresponding divergence value. Example context domains are illustrated in tree structure 700.

In some implementations of example method 1200, the plurality of divergence metrics include at least one of the following divergence metrics: a three-dimensional intersection over union of the labeled bounding box and the detected bounding box; an intersection over union of a projection of the labeled bounding box into a range view and a projection of the detected bounding box into the range view; a difference in volume between the labeled bounding box and the detected bounding box; a difference between: a detected distance between the labeled bounding box and a position associated with the autonomous vehicle, and a detected distance between the detected bounding box and the position associated with the autonomous vehicle; a difference between: a predicted distance between an expected position of the labeled bounding box and a position associated with the autonomous vehicle, and a predicted distance between an expected position of the detected bounding box and the position associated with the autonomous vehicle; a difference in a detected forward velocity associated with the object and a labeled forward velocity associated with the object; or a difference in a detected heading associated with the object and a labeled heading associated with the object.

In some implementations of example method 1200, the plurality of divergence metrics can indicate future-time divergences. An example future-time divergence can include a difference between a predicted distance between an expected position of the labeled bounding box and a position associated with the autonomous vehicle. In some implementations of example method 1200, the plurality of divergence metrics include a difference between a predicted distance between an expected position of the detected bounding box and the position associated with the autonomous vehicle. In some implementations of example method 1200, a respective contribution of a respective component divergence value using the difference is weighted based on a time horizon for which the predicted distances are obtained.

In some implementations of example method 1200, a score satisfying the first threshold indicates that the perception system satisfactorily tracked the object (e.g., "Detection": True). In some implementations of example method 1200, a score satisfying the second threshold but not the first threshold indicates that the perception system suboptimally tracked the object (e.g., "Detection": False).

In some implementations, example method 1200 includes training, using a plurality of example matches having scores that satisfy the second threshold but not the first threshold, the perception system to improve a tracking performance. In some implementations, example method 1200 includes training, using a plurality of example matches having scores that do not satisfy the second threshold or the first threshold (e.g., "Detection": None), the perception system to discard invalid tracks.

Figure 13:
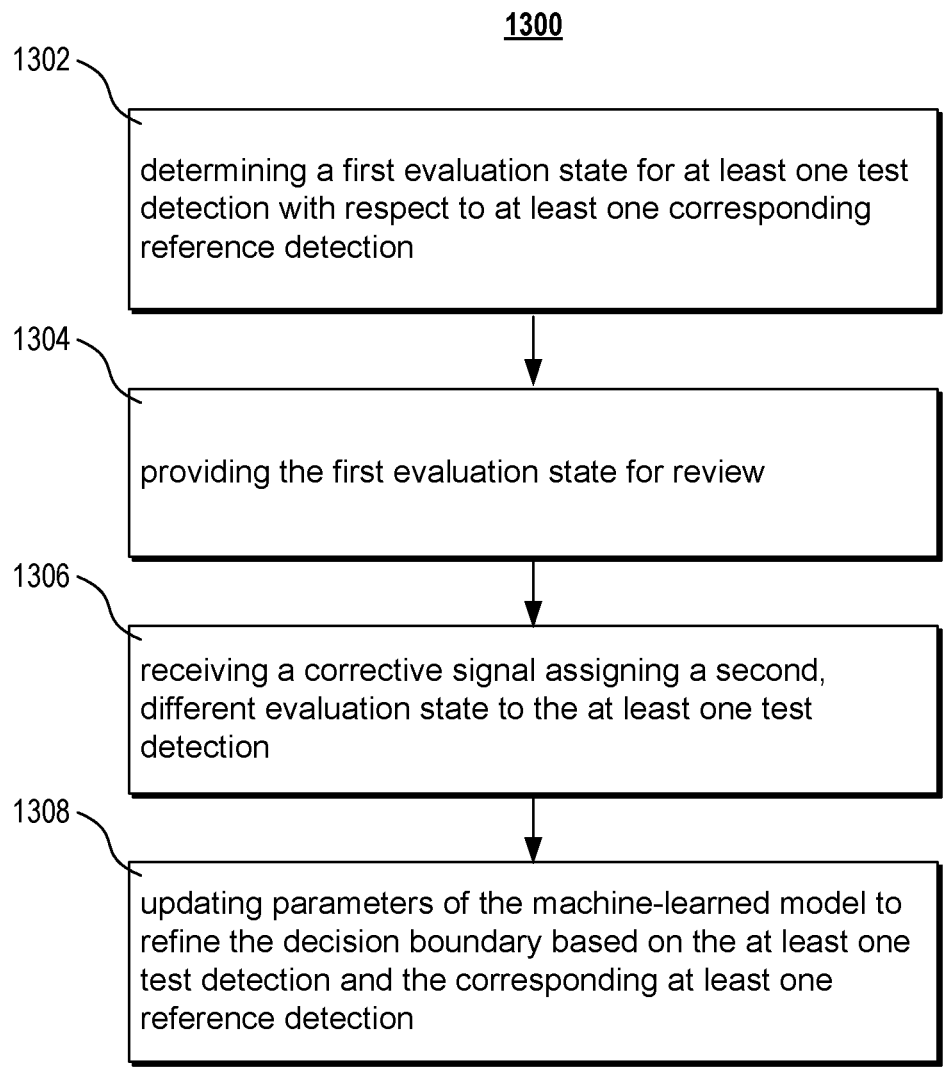
FIG. 13 is a flowchart of an example method for updating an example evaluation system, according to some implementations of the present disclosure.

FIG. 13 is a flowchart of an example method 1300 for updating a machine-learned component of an evaluation system according to aspects of the present disclosure. One or more portions of example method 1300 can be implemented by the computing systems described with reference to the other figures (e.g., autonomous platform 110, vehicle computing system 180, remote system 160, a system of FIGS. 1 to 15, etc.). Each respective portion of example method 1300 can be performed by any (or any combination) of one or more computing devices. Moreover, one or more portions of example method 1300 can be implemented on the hardware components of the devices described herein (e.g., as in FIGS. 1 to 15, etc.).

FIG. 13 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 13 is described with reference to elements/terms described with respect to other systems and figures for exemplary illustrated purposes and is not meant to be limiting. One or more portions of example method 1300 can be performed additionally, or alternatively, by other systems.

At 1302, example method 1300 can include determining a first evaluation state for at least one test detection with respect to at least one corresponding reference detection. For example, evaluation system 400 can generate, for unit test 1002-$i$, the first evaluation state comparing detected object box 1006-$i$ and labeled object box 1008-$i$.

At 1304, example method 1300 can include providing the first evaluation state for review. For example, the first evaluation state can be compared against a ground truth evaluation state. For instance, unit test 1002-$i$ can include a ground truth evaluation state 1010-$i$ against which the first evaluation state can be compared.

At 1306, example method 1300 can include receiving a corrective signal assigning a second, different evaluation state to the at least one test detection. For instance, if the first evaluation state disagrees with the ground truth evaluation state, a corrective signal can include an indication of the disagreement (e.g., a cost, a loss, a boolean failure signal, a penalty, etc.).

For example, a first evaluation state can be a false positive or a false negative. For instance, a false positive evaluation state can indicate an absence of a material divergence (e.g., an indicated "match"). A false positive evaluation state can correspond to an indicated match when the detection does in fact materially diverge from the label. A false negative evaluation state can indicate the presence of a material divergence (e.g., an indicated failure to "match"). A false negative evaluation state can correspond to an indicated material divergence when the detection does not in fact materially diverge from the label.

At 1308, example method 1300 can include updating parameters of the machine-learned model to refine the decision boundary based on the at least one test detection and the corresponding at least one reference detection.

For example, learnable parameters of evaluation system 400 (e.g., of machine-learned model 418) can be re-learned until satisfactorily evaluating the at least one test detection and the corresponding at least one reference detection. For example, numerical optimization of the parameters can search over a parameter space to return a set of parameters that correctly evaluate all unit tests as well as evaluating the at least one test detection and the corresponding at least one reference detection.

In some implementations, the at least one test detection and the corresponding at least one reference detection can be used to form a new unit test. For example, a batch of new detections can be processed using evaluation system 400. A labeling system can return ground truth labels associated with the real or simulated sensor data that was processed to generate the new detections. Evaluation system 400 can compare the new detections to the ground truth labels. The outputs of evaluation system 400 can be reviewed in whole or in part. For instance, detection failures can be reviewed to evaluate whether the detections are appropriately classified as failures. Detection successes can be reviewed to evaluate whether the detections are appropriately classified as successful detections.

This review can reveal false positive or false negative evaluations. To improve the performance of evaluation system 400, the underlying detections, labels, and ground truth evaluation states for these false positive or false negative evaluations can form new unit tests. Learnable parameters of evaluation system 400 can be re-learned based on the updated set of unit tests.

If machine-learned calibration model 418 does not or cannot converge to a set of weights that enables correct labeling of all unit tests (e.g., including the updated set of unit tests), then evaluation system 400 can add additional expressivity to more fully model the task. For example, evaluation system 400 can compute additional divergence metrics. Evaluation system 400 can use additional context metrics (or more expressive or granular versions of existing metrics). Evaluation system 400 can add additional learnable parameters to machine-learned model 418. Increasing the expressivity of evaluation system 400 can increase a precision with which evaluation system 400 can model a desired decision boundary between object detections that "match" or are aligned closely enough and object detections that do not "match" or are not aligned closely enough.

Figure 14:
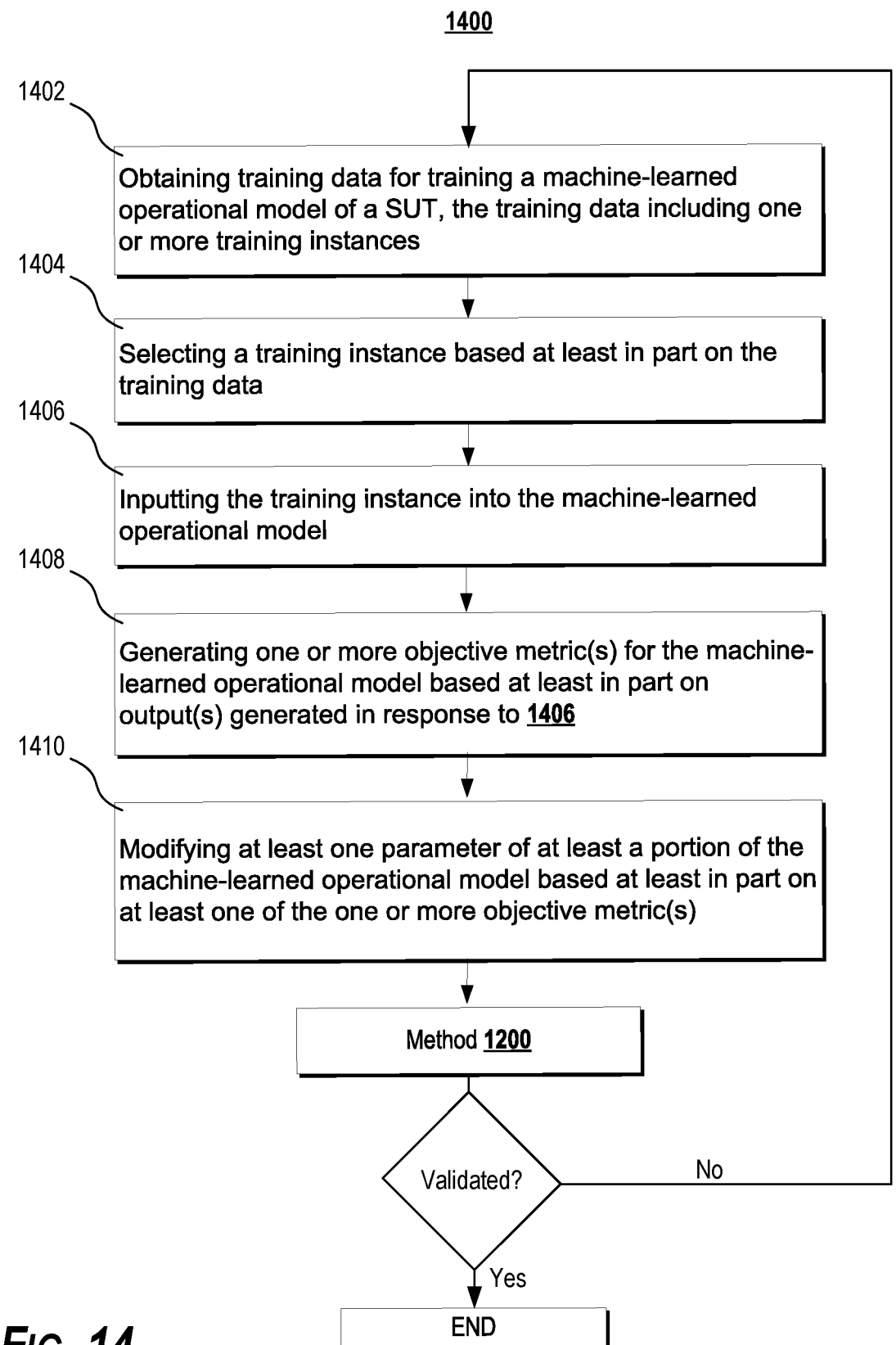
FIG. 14 is a flowchart of an example method for training and validating a machine-learned operational system, according to some implementations of the present disclosure.

FIG. 14 is a flowchart of a method 1400 for training one or more machine-learned operational models, according to aspects of the present disclosure.

One or more portions of example method 1400 can be implemented by a computing system that includes one or more computing devices such as, for example, the computing systems described with reference to the other figures (e.g., autonomous platform 110, vehicle computing system 180, remote system 160, a system of FIGS. 1 to 15, etc.). Each respective portion of example method 1400 can be performed by any (or any combination) of one or more computing devices. Moreover, one or more portions of example method 1400 can be implemented on the hardware components of the devices described herein (e.g., as in FIGS. 1 to 15, etc.), for example, to validate one or more systems or models.

FIG. 14 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 14 is described with reference to elements/terms described with respect to other systems and figures for exemplary illustrated purposes and is not meant to be limiting. One or more portions of example method 1400 can be performed additionally, or alternatively, by other systems.

At 1402, example method 1400 can include obtaining training data for training a machine-learned operational model. The training data can include a plurality of training instances.

The training data can be collected using one or more autonomous platforms (e.g., autonomous platform 110) or the sensors thereof as the autonomous platform is within its environment. By way of example, the training data can be collected using one or more autonomous vehicles (e.g., autonomous platform 110, autonomous vehicle 350, etc.) or sensors thereof as the vehicle operates along one or more travel ways. In some examples, the training data can be collected using other sensors, such as mobile-device-based sensors, ground-based sensors, aerial-based sensors, satellite-based sensors, or substantially any sensor interface configured for obtaining and/or recording measured data.

The training data can include a plurality of training sequences divided between multiple datasets (e.g., a training dataset, a validation dataset, or testing dataset). Each training sequence can include a plurality of pre-recorded perception datapoints, point clouds, images, etc. In some implementations, each sequence can include LIDAR point clouds (e.g., collected using LIDAR sensors of an autonomous platform), images (e.g., collected using mono or stereo imaging sensors, etc.), and the like. For instance, in some implementations, a plurality of images can be scaled for training and evaluation.

At 1404, example method 1400 can include selecting a training instance based at least in part on the training data.

At 1406, example method 1400 can include inputting the training instance into the machine-learned operational model.

At 1408, example method 1400 can include generating one or more loss metrics and/or one or more objectives for the machine-learned operational model based on outputs of at least a portion of the machine-learned operational model and labels associated with the training instances.

At 1410, example method 1400 can include modifying at least one parameter of at least a portion of the machine-learned operational model based at least in part on at least one of the loss metrics and/or at least one of the objectives. For example, a computing system can modify at least a portion of the machine-learned operational model based at least in part on at least one of the loss metrics and/or at least one of the objectives.

In some implementations, the machine-learned operational model can be trained in an end-to-end manner. For example, in some implementations, the machine-learned operational model can be fully differentiable.

After being updated, the operational model or the operational system including the operational model can be provided for validation (e.g., according to example implementations of example method 1200, etc.). In some implementations, a validation system can evaluate or validate the operational system. The validation system can trigger retraining, decommissioning, etc. of the operational system based on, for example, failure to satisfy a validation threshold in one or more areas.

Figure 15:
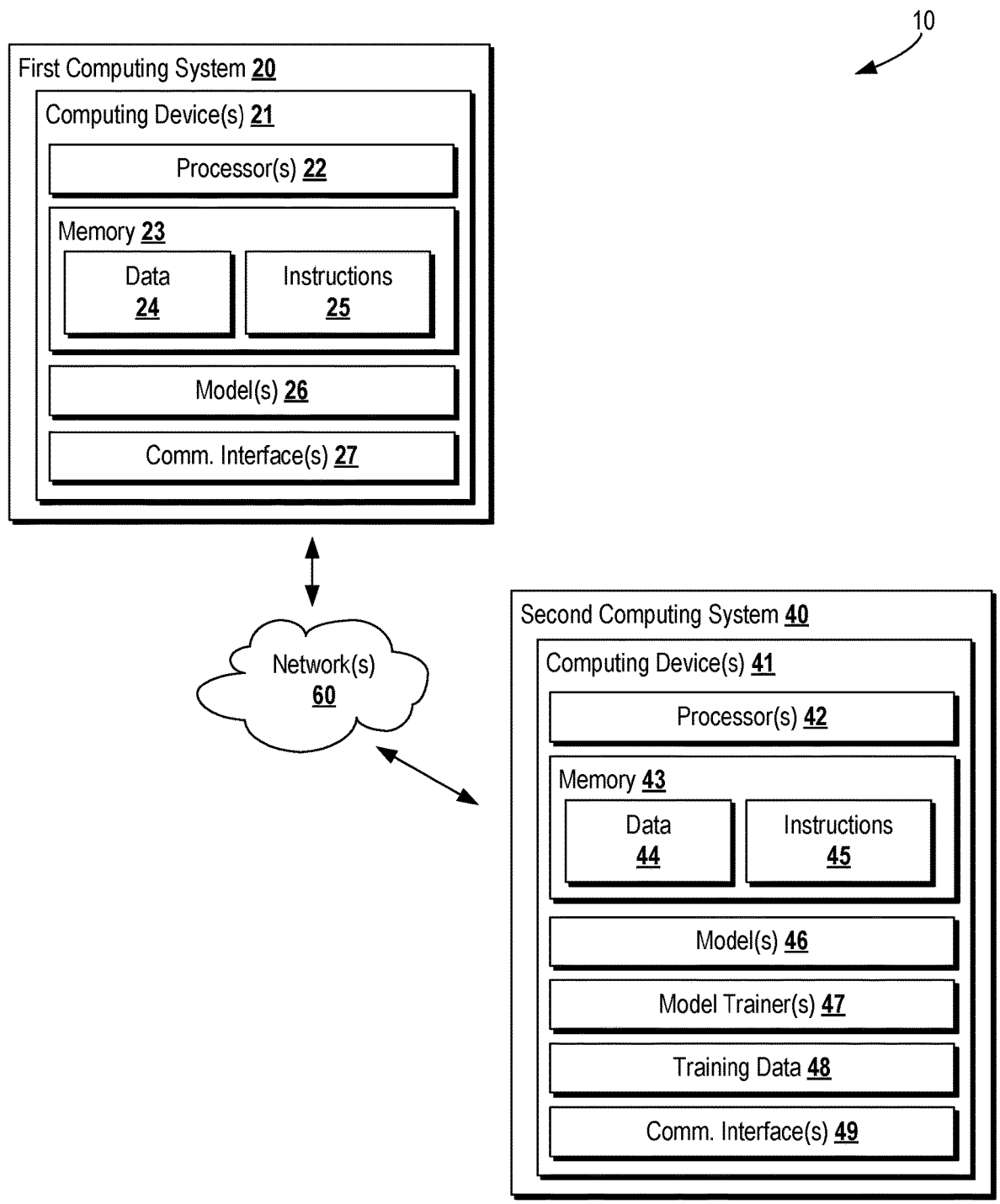
FIG. 15 is a block diagram of an example computing system, according to some implementations of the present disclosure.

FIG. 15 is a block diagram of an example computing ecosystem 10 according to example implementations of the present disclosure. The example computing ecosystem 10 can include a first computing system 20 and a second computing system 40 that are communicatively coupled over one or more networks 60. In some implementations, the first computing system 20 or the second computing 40 can implement one or more of the systems, operations, or functionalities described herein for validating one or more systems or operational systems (e.g., the remote system 160, the onboard computing system 180, the autonomy system 200, etc.).

In some implementations, the first computing system 20 can be included in an autonomous platform and be utilized to perform the functions of an autonomous platform as described herein. For example, the first computing system 20 can be located onboard an autonomous vehicle and implement autonomy system for autonomously operating the autonomous vehicle. In some implementations, the first computing system 20 can represent the entire onboard computing system or a portion thereof (e.g., the localization system 230, the perception system 240, the planning system 250, the control system 260, or a combination thereof, etc.). In other implementations, the first computing system 20 may not be located onboard an autonomous platform. The first computing system 20 can include one or more distinct physical computing devices 21.

The first computing system 20 (e.g., the computing devices 21 thereof) can include one or more processors 22 and a memory 23. The one or more processors 22 can be any suitable processing device (e.g., a processor core, a microprocessor, an ASIC, a FPGA, a controller, a microcontroller, etc.) and can be one processor or a plurality of processors that are operatively connected. Memory 23 can include one or more non-transitory computer-readable storage media, such as RAM, ROM, EEPROM, EPROM, one or more memory devices, flash memory devices, etc., and combinations thereof.

Memory 23 can store information that can be accessed by the one or more processors 22. For instance, the memory 23 (e.g., one or more non-transitory computer-readable storage media, memory devices, etc.) can store data 24 that can be obtained (e.g., received, accessed, written, manipulated, created, generated, stored, pulled, downloaded, etc.). The data 24 can include, for instance, sensor data, map data, data associated with autonomy functions (e.g., data associated with the perception, planning, or control functions), simulation data, or any data or information described herein. In some implementations, the first computing system 20 can obtain data from one or more memory devices that are remote from the first computing system 20.

Memory 23 can store computer-readable instructions 25 that can be executed by the one or more processors 22. Instructions 25 can be software written in any suitable programming language or can be implemented in hardware. Additionally, or alternatively, instructions 25 can be executed in logically or virtually separate threads on the processors 22.

For example, the memory 23 can store instructions 25 that are executable by one or more processors (e.g., by the one or more processors 22, by one or more other processors, etc.) to perform (e.g., with the computing devices 21, the first computing system 20, or other systems having processors executing the instructions) any of the operations, functions, or methods/processes (or portions thereof) described herein. For example, operations can include implementing system validation (e.g., as described herein).

In some implementations, the first computing system 20 can store or include one or more models 26. In some implementations, the models 26 can be or can otherwise include one or more machine-learned models (e.g., a machine-learned operational system, etc.). As examples, the models 26 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the first computing system 20 can include one or more models for implementing subsystems of the autonomy system 200, including any of: the localization system 230, the perception system 240, the planning system 250, or the control system 260.

In some implementations, the first computing system 20 can obtain the one or more models 26 using communication interface 27 to communicate with the second computing system 40 over the network 60. For instance, the first computing system 20 can store the models 26 (e.g., one or more machine-learned models) in memory 23. The first computing system 20 can then use or otherwise implement the models 26 (e.g., by the processors 22). By way of example, the first computing system 20 can implement the models 26 to localize an autonomous platform in an environment, perceive an autonomous platform's environment or objects therein, plan one or more future states of an autonomous platform for moving through an environment, control an autonomous platform for interacting with an environment, etc.

The second computing system 40 can include one or more computing devices 41. The second computing system 40 can include one or more processors 42 and a memory 43. The one or more processors 42 can be any suitable processing device (e.g., a processor core, a microprocessor, an ASIC, a FPGA, a controller, a microcontroller, etc.) and can be one processor or a plurality of processors that are operatively connected. The memory 43 can include one or more non-transitory computer-readable storage media, such as RAM, ROM, EEPROM, EPROM, one or more memory devices, flash memory devices, etc., and combinations thereof.

Memory 43 can store information that can be accessed by the one or more processors 42. For instance, the memory 43 (e.g., one or more non-transitory computer-readable storage media, memory devices, etc.) can store data 44 that can be obtained. The data 44 can include, for instance, sensor data, model parameters, map data, simulation data, simulated environmental scenes, simulated sensor data, data associated with vehicle trips/services, or any data or information described herein. In some implementations, the second computing system 40 can obtain data from one or more memory devices that are remote from the second computing system 40.

Memory 43 can also store computer-readable instructions 45 that can be executed by the one or more processors 42. The instructions 45 can be software written in any suitable programming language or can be implemented in hardware. Additionally, or alternatively, the instructions 45 can be executed in logically or virtually separate threads on the processors 42.

For example, memory 43 can store instructions 45 that are executable (e.g., by the one or more processors 42, by the one or more processors 22, by one or more other processors, etc.) to perform (e.g., with the computing devices 41, the second computing system 40, or other systems having processors for executing the instructions, such as computing devices 21 or the first computing system 20) any of the operations, functions, or methods/processes described herein. This can include, for example, the functionality of the autonomy system 200 (e.g., localization, perception, planning, control, etc.) or other functionality associated with an autonomous platform (e.g., remote assistance, mapping, fleet management, trip/service assignment and matching, etc.). This can also include, for example, validating a machined-learned operational system.

In some implementations, second computing system 40 can include one or more server computing devices. In the event that the second computing system 40 includes multiple server computing devices, such server computing devices can operate according to various computing architectures, including, for example, sequential computing architectures, parallel computing architectures, or some combination thereof.

Additionally, or alternatively to, the models 26 at the first computing system 20, the second computing system 40 can include one or more models 46. As examples, the models 46 can be or can otherwise include various machine-learned models (e.g., a machine-learned operational system, etc.) such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the second computing system 40 can include one or more models of the autonomy system 200.

In some implementations, the second computing system 40 or the first computing system 20 can train one or more machine-learned models of the models 26 or the models 46 through the use of one or more model trainers 47 and training data 48. The model trainer 47 can train any one of the models 26 or the models 46 using one or more training or learning algorithms. One example training technique is backwards propagation of errors. In some implementations, the model trainer 47 can perform supervised training techniques using labeled training data. In other implementations, the model trainer 47 can perform unsupervised training techniques using unlabeled training data. In some implementations, the training data 48 can include simulated training data (e.g., training data obtained from simulated scenarios, inputs, configurations, environments, etc.). In some implementations, the second computing system 40 can implement simulations for obtaining the training data 48 or for implementing the model trainer 47 for training or testing the models 26 or the models 46. By way of example, the model trainer 47 can train one or more components of a machine-learned model for the autonomy system 200 through unsupervised training techniques using an objective function (e.g., costs, rewards, heuristics, constraints, etc.). In some implementations, the model trainer 47 can perform a number of generalization techniques to improve the generalization capability of the models being trained. Generalization techniques include weight decays, dropouts, or other techniques.

For example, in some implementations, the second computing system 40 can generate training data 48 according to example aspects of the present disclosure. For instance, the second computing system 40 can generate training data 48. For instance, the second computing system 40 can implement methods according to example aspects of the present disclosure. The second computing system 40 can use the training data 48 to train models 26. For example, in some implementations, the first computing system 20 can include a computing system onboard or otherwise associated with a real or simulated autonomous vehicle. In some implementations, models 26 can include perception or machine vision models configured for deployment onboard or in service of a real or simulated autonomous vehicle. In this manner, for instance, the second computing system 40 can provide a training pipeline for training models 26.

The first computing system 20 and the second computing system 40 can each include communication interfaces 27 and 49, respectively. The communication interfaces 27, 49 can be used to communicate with each other or one or more other systems or devices, including systems or devices that are remotely located from the first computing system 20 or the second computing system 40. The communication interfaces 27, 49 can include any circuits, components, software, etc. for communicating with one or more networks (e.g., the network 60). In some implementations, the communication interfaces 27, 49 can include, for example, one or more of a communications controller, receiver, transceiver, transmitter, port, conductors, software or hardware for communicating data.

The network 60 can be any type of network or combination of networks that allows for communication between devices. In some implementations, the network can include one or more of a local area network, wide area network, the Internet, secure network, cellular network, mesh network, peer-to-peer communication link or some combination thereof and can include any number of wired or wireless links. Communication over the network 60 can be accomplished, for instance, through a network interface using any type of protocol, protection scheme, encoding, format, packaging, etc.

FIG. 15 illustrates one example computing ecosystem 10 that can be used to implement the present disclosure. For example one or more systems or devices of ecosystem 10 can implement any one or more of the systems and components described in the preceding figures. Other systems can be used as well. For example, in some implementations, the first computing system 20 can include the model trainer 47 and the training data 48. In such implementations, the models 26, 46 can be both trained and used locally at the first computing system 20. As another example, in some implementations, the computing system 20 may not be connected to other computing systems. Additionally, components illustrated or discussed as being included in one of the computing systems 20 or 40 can instead be included in another one of the computing systems 20 or 40.

Computing tasks discussed herein as being performed at computing devices remote from the autonomous platform (e.g., autonomous vehicle) can instead be performed at the autonomous platform (e.g., via a vehicle computing system of the autonomous vehicle), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

Aspects of the disclosure have been described in terms of illustrative implementations thereof. Numerous other implementations, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein can be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of operations. For instance, letter identifiers such as (a), (b), (c), . . . , (i), (ii), (iii), . . . , etc. can be used to illustrate operations. Such identifiers are provided for the case of the reader and do not denote a particular order of steps or operations. An operation illustrated by a list identifier of (a), (i), etc. can be performed before, after, or in parallel with another operation illustrated by a list identifier of (b), (ii), etc.

The term "can" should be understood as referring to a possibility of a feature in various implementations and not as prescribing an ability that is necessarily present in every implementation. For example, the phrase "X can perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

The term "may" should be understood as referring to a possibility of a feature in various implementations and not as prescribing an ability that is necessarily present in every implementation. For example, the phrase "X may perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

What is claimed is:

1. A computer-implemented method for validating a perception system of an autonomous vehicle, comprising:
   (a) obtaining an object detection from a perception system that describes an object in an environment of the autonomous vehicle;
   (b) obtaining, from a reference dataset, a label that describes a reference position of the object in the environment;
   (c) determining a plurality of component divergence values respectively for a plurality of divergence metrics, wherein a respective divergence value characterizes a respective difference between the object detection and the label;
   (d) providing the plurality of component divergence values to a machine-learned model to generate a score that indicates an aggregate divergence between the object detection and the label, wherein the machine-learned model comprises a plurality of learned parameters defining an influence of the plurality of component divergence values on the score, wherein the score indicates a quality of a match between the object detection and the label; and
   (e) validating the perception system based on the score.

2. The computer-implemented method of claim 1, comprising:
   assigning an evaluation state to a component of the perception system based on the score.

3. The computer-implemented method of claim 2, comprising:
   generating, using the machine-learned model, a respective score for a respective object detection of a plurality of object detections generated by the perception system to determine a quality of a match with a respective label corresponding to the respective object detection;
   wherein assigning an evaluation state to the component of the perception system based on the score comprises:
      determining a proportion of matches for the plurality of object detections that satisfy a threshold quality;
      comparing the proportion to a target threshold proportion, and
      assigning the evaluation state based on the comparison.

4. The computer-implemented method of claim 1, comprising, prior to (c), determining the plurality of learned parameters by fitting a linear model to a plurality of unit tests, wherein a respective unit test comprises an example object detection and a unit test label indicating reference data for the object.

5. The computer-implemented method of claim 4, wherein the respective unit test is stored in association with a ground truth designation indicating whether there is a material divergence between the example object detection and the unit test label.

6. The computer-implemented method of claim 1, wherein:
   the object detection and the label are obtained from a unit test associated with a positive match; and (e) comprises:
    determining that the score indicates a negative match based on a failure of the score to satisfy a threshold; and
    updating one or more of the plurality of learned parameters to cause the score to satisfy the threshold.

7. The computer-implemented method of claim 1, wherein the plurality of learned parameters respectively correspond to the plurality of divergence metrics.

8. The computer-implemented method of claim 1, comprising:
    weighting a respective contribution of the respective component divergence value using a context value obtained using a context metric, wherein the context value is based on an attribute of the object.

9. The computer-implemented method of claim 8, comprising:
    determining, using the context metric and based on an attribute of the object detection or the label, a context domain for the respective component divergence value; and
    weighting the respective contribution of the respective component divergence value based on a weighting parameter associated with the context domain.

10. The computer-implemented method of claim 1, wherein the score comprises a weighted combination of the plurality of component divergence values, wherein the plurality of learned parameters are used to perform the weighting in the weighted combination.

11. The computer-implemented method of claim 10, wherein the weighted combination is a linear combination.

12. The computer-implemented method of claim 1, wherein the score is generated using a piecewise function that is linear with respect to each component divergence metric.

13. The computer-implemented method of claim 12, wherein the piecewise function comprises learnable parameters that are constrained from flipping a direction of a contribution of a component divergence metric to the score.

14. The computer-implemented method of claim 1, wherein the plurality of divergence metrics are evaluated between a labeled bounding box and a detected bounding box from the object detection.

15. The computer-implemented method of claim 14, wherein the plurality of divergence metrics comprise at least one of the following divergence metrics:
    a two-dimensional intersection over union of the labeled bounding box and the detected bounding box;
    a three-dimensional intersection over union of the labeled bounding box and the detected bounding box;
    an intersection over union of a projection of the labeled bounding box into a range view and a projection of the detected bounding box into the range view;
    a difference in volume between the labeled bounding box and the detected bounding box;
    a difference between:
        a detected distance between the labeled bounding box and a position associated with the autonomous vehicle, and
        a detected distance between the detected bounding box and the position associated with the autonomous vehicle;
    a difference between:
        a predicted distance between an expected position of the labeled bounding box and a position associated with the autonomous vehicle, and
        a predicted distance between an expected position of the detected bounding box and the position associated with the autonomous vehicle,
    a difference in a detected forward velocity associated with the object and a labeled forward velocity associated with the object; or
    a difference in a detected heading associated with the object and a labeled heading associated with the object.

16. The computer-implemented method of claim 1, wherein:
    the plurality of divergence metrics comprise a difference between:
        a predicted distance between an expected position of the labeled bounding box and a position associated with the autonomous vehicle, and
        a predicted distance between an expected position of the detected bounding box and the position associated with the autonomous vehicle; and
    a respective contribution of a respective component divergence value using the difference is weighted based on a time horizon for which the predicted distances are obtained.

17. The computer-implemented method of claim 1, wherein validating the perception system based on the score comprises comparing the score to a first threshold and a second threshold different than the first threshold, wherein:
    a score satisfying the first threshold indicates that the perception system satisfactorily detected the object; and
    a score satisfying the second threshold but not the first threshold indicates that the perception system suboptimally detected the object.

18. The computer-implemented method of claim 17, comprising:
    training, using a plurality of example matches having scores that satisfy the second threshold but not the first threshold, the perception system to improve an object detection performance; and
    training, using a plurality of example matches having scores that do not satisfy the second threshold or the first threshold, the perception system to discard invalid object detections.

19. A computing system, comprising:
    one or more processors; and
    one or more non-transitory computer-readable media storing instructions that are executable by the one or more processors to cause the computing system to perform operations, the operations comprising:
    (a) obtaining an object detection from a perception system that describes an object in an environment of an autonomous vehicle;
    (b) obtaining, from a reference dataset, a label that describes a reference position of the object in the environment;
    (c) determining a plurality of component divergence values respectively for a plurality of divergence metrics, wherein a respective divergence value characterizes a respective difference between the object detection and the label;
    (d) providing the plurality of component divergence values to a machine-learned model to generate a score that indicates an aggregate divergence between the object detection and the label, wherein the machine-learned model comprises a plurality of learned parameters defining an influence of the plurality of component divergence values on the score, wherein the score indicates a quality of a match between the object detection and the label; and (e) validating the perception system based on the score.

20. An autonomous vehicle control system for controlling an autonomous vehicle, the autonomous vehicle control system comprising:

a perception system that is configured to parse input sensor data descriptive of an environment and output perception data tracking objects in the environment, wherein the perception system is validated by:

(a) obtaining a validation object detection from the perception system that describes a validation object in a validation environment;

(b) obtaining, from a reference dataset, a label that describes a reference position of the validation object in the validation environment;

(c) determining a plurality of component divergence values respectively for a plurality of divergence metrics, wherein a respective divergence value characterizes a respective difference between the validation object detection and the label;

(d) providing the plurality of component divergence values to a machine-learned model to generate a score that indicates an aggregate divergence between the validation object detection and the label, wherein the machine-learned model comprises a plurality of learned parameters defining an influence of the plurality of component divergence values on the score, wherein the score indicates a quality of a match between the object detection and the label; and (e) validating the perception system based on the score.

* * * * *